(12) United States Patent
Brunelle et al.

(10) Patent No.: US 6,596,843 B2
(45) Date of Patent: Jul. 22, 2003

(54) THERMALLY STABLE POLYMERS, METHOD OF PREPARATION, AND ARTICLES MADE THEREFROM

(75) Inventors: Daniel Joseph Brunelle, Burnt Hills, NY (US); Paul Dean Sybert, Evansville, IN (US); Gregory Allen O'Neil, Clifton Park, NY (US); Joseph Anthony Suriano, Clifton Park, NY (US); Tiberiu Mircea Siclovan, Rexford, NY (US); Zhaohui Su, Evansville, IN (US)

(73) Assignee: General Electric Company, Niskayuna, NY (US)

( * ) Notice: Subject to any disclaimer, the term of this patent is extended or adjusted under 35 U.S.C. 154(b) by 90 days.

(21) Appl. No.: 09/966,127

(22) Filed: Sep. 28, 2001

(65) Prior Publication Data

US 2002/0039657 A1 Apr. 4, 2002

Related U.S. Application Data

(63) Continuation-in-part of application No. 09/368,706, filed on Aug. 5, 1999, now Pat. No. 6,306,507.
(60) Provisional application No. 60/134,692, filed on May 18, 1999.

(51) Int. Cl.⁷ .............................. C08F 6/12; C08G 63/12; C08G 63/16; C08L 67/02
(52) U.S. Cl. ...................... 528/486; 528/489; 528/490; 528/497; 528/499; 528/194; 528/176; 528/302; 528/308.6; 528/104; 525/165; 525/58; 525/133; 525/191; 428/423.7
(58) Field of Search .................. 528/486, 489, 528/490, 497, 499, 194, 176, 300, 308.6, 104; 525/165, 88, 133, 191; 428/423.1

(56) References Cited

U.S. PATENT DOCUMENTS

| | | | |
|---|---|---|---|
| 3,030,331 A | 4/1962 | Goldberg |
| 3,207,814 A | 9/1965 | Goldberg |
| 3,444,129 A | 5/1969 | Young, Jr. et al. |
| 3,460,961 A | 8/1969 | Young et al. |
| 3,939,117 A | 2/1976 | Ueno |
| 4,127,560 A | 11/1978 | Kramer |
| 4,156,069 A | 5/1979 | Prevorsek et al. |
| 4,238,596 A | 12/1980 | Quinn |
| 4,238,597 A | 12/1980 | Markezich et al. |
| 4,281,099 A | 7/1981 | Maresca |
| 4,308,406 A | 12/1981 | Takenaka et al. |
| 4,334,053 A | 6/1982 | Freitag et al. |
| 4,454,275 A | 6/1984 | Rosenquist |
| 4,482,694 A | 11/1984 | Freitag et al. |
| 4,495,325 A | 1/1985 | DeBergalis et al. |
| 4,503,121 A | 3/1985 | Robeson et al. |
| 4,506,065 A | 3/1985 | Miller et al. |
| 4,576,842 A | 3/1986 | Hartsing et al. |
| 4,617,368 A | 10/1986 | Freitag et al. |
| 4,643,937 A | 2/1987 | Dickinson et al. |
| 4,894,486 A | 1/1990 | Neil, Jr. et al. |
| 4,931,364 A | 6/1990 | Dickinson |
| 4,948,864 A | 8/1990 | Imai et al. |
| 4,973,652 A | 11/1990 | Ebert et al. |
| 4,992,322 A | 2/1991 | Curry et al. |
| 5,030,505 A | 7/1991 | Dickinson |
| 5,036,150 A | 7/1991 | Kawakami et al. |
| 5,064,704 A | 11/1991 | Stewart |
| 5,321,114 A | 6/1994 | Fontana et al. |
| 5,414,149 A | 5/1995 | Garrett et al. |
| 5,714,567 A | 2/1998 | Idage et al. |
| 5,807,965 A | 9/1998 | Davis |
| 6,265,522 B1 * | 7/2001 | Brunelle et al. |
| 6,291,589 B1 * | 9/2001 | Brunelle et al. |
| 6,294,647 B1 * | 9/2001 | Brunelle et al. |

FOREIGN PATENT DOCUMENTS

| | | |
|---|---|---|
| DE | 1927938 | 12/1970 |
| JP | 56/133332 | 10/1981 |
| JP | 1/199841 | 8/1989 |
| JP | 1/201326 | 8/1989 |
| JP | 06 122756 | 5/1994 |

OTHER PUBLICATIONS

Eareckson, Journal of Polymer Science, vol. XL, pp. 399–406 (1959).
Cohen, et al., Journal of Polymer Science, Part A–1, vol. 9, 3263–3299 (1971).

* cited by examiner

*Primary Examiner*—Duc Truong
(74) *Attorney, Agent, or Firm*—Noreen C. Johnson; Christian G. Cabou

(57) ABSTRACT

Thermally stable polymers comprising resorcinol arylate chain members are prepared using an interfacial method comprising the steps of: interfacial method for preparing polymers comprising resorcinol arylate polyester chain members substantially free of anhydride linkages linking at least two mers of the polymer chain, comprising the steps of: (a) preparing an aqueous solution comprising at least one resorcinol moiety, said solution having a pH less than or equal to about 5; (b) after step (a), preparing a mixture comprising the resorcinol moiety, at least one catalyst and at least one organic solvent substantially immiscible with water; and (c) adding to the mixture from (b) at least one dicarboxylic acid dichloride while maintaining the pH between 3 and 8.5 through the presence of an acid acceptor, wherein the total molar amount of acid chloride groups is stoichiometrically deficient relative to the total molar amount of phenolic groups.

131 Claims, No Drawings

THERMALLY STABLE POLYMERS, METHOD OF PREPARATION, AND ARTICLES MADE THEREFROM

CROSS-REFERENCE TO RELATED APPLICATION

This application is a continuation-in-part of U.S. application Ser. No. 09/368,706, filed Aug. 5, 1999, now U.S. Pat. No. 6,306,507 which claims the benefit of U.S. Provisional Application No. 60/134,692, filed May 18, 1999, and which applications are incorporated herein by reference.

BACKGROUND OF THE INVENTION

This invention relates to thermally stable polymers comprising polyester chain members derived from at least one 1,3-dihydroxybenzene moiety and at least one aromatic dicarboxylic acid moiety (often referred to hereinafter as resorcinol arylate chain members), a method for their preparation, and multilayer articles made therefrom.

Various polymeric articles have a problem of long term color instability. In many cases this instability is seen as yellowing of the polymer, detracting from its attractiveness and also transparency when the polymer was initially transparent. Loss of gloss can also be an undesirable long term phenomenon.

Yellowing of polymers is often caused by the action of ultraviolet radiation, and such yellowing is frequently designated "photoyellowing". Numerous means for suppressing photoyellowing have been employed and proposed. Many of these involve incorporation in the polymer of ultraviolet absorbing compounds (UVA's). For the most part, UVA's are low molecular weight compounds, which must be employed at relatively low levels, typically up to 1% by weight, to avoid degradation of the physical properties of the polymer such as impact strength and high temperature properties as reflected in heat distortion temperature. Another problem of concern with polymers such as aromatic polycarbonates and addition polymers of alkenylaromatic compounds such as styrene is susceptibility to attack by organic liquids.

One way of protecting a resinous article against photoyellowing and loss of gloss is to apply a coating of a weatherable second polymer, the term "weatherable" as used herein signifying resistance to such phenomena. Coatings made from polyesters containing resorcinol arylate units often possess good weatherability properties. The arylate moieties typically contain isophthalate, terephthalate, and especially mixtures of iso- and terephthalate units. Polyesters of resorcinol with mixtures of isophthalate and terephthalate chain members typically have good weatherability properties and may provide protection against photoyellowing when coated over a resinous substrate.

The good weatherability properties of polyesters containing resorcinol arylate units are believed to arise in large part from the screening effect said polymers may provide to ultraviolet (UV) light. On exposure to UV light polymers comprising resorcinol arylate chain members may undergo photochemical Fries rearrangement converting at least a portion of the polymer from polyester chain members to o-hydroxybenzophenone-type chain members. The o-hydroxybenzophenone-type chain members act to screen further UV light and protect UV-sensitive components in a resorcinol arylate-containing composition. The good weatherability properties of polymers comprising resorcinol arylate chain members make them especially useful in blends and in multilayer articles in which said polymers may act as a protecting layer for more sensitive substrate components.

Copolyesters comprising resorcinol iso- and terephthalate polyester chain members in combination with diacid or diol alkylene chain members (so-called "soft-block" chain members) are disclosed in commonly owned U.S. Pat. No. 5,916,997. These copolymers have excellent weatherability and flexibility. Copolyestercarbonates comprising resorcinol iso- and terephthalate polyester chain members in combination with carbonate chain members are disclosed in commonly owned, co-pending application Ser. No. 09/416,529, filed Oct. 12, 1999. These copolymers have excellent weatherability and are compatible with polycarbonates in blends.

Polyesters containing resorcinol arylate chain members have been prepared by melt methods as disclosed in U.S. Pat. No. 4,127,560 and in Japanese Kokai 1/201,326. The methods may provide polyesters containing isophthalate and terephthalate chain members but do not allow the incorporation of greater than 30 mole % terephthalate. In addition, the polyesters obtained have unacceptable color.

Polyesters containing resorcinol arylate chain members have also been prepared by an interfacial method. The interfacial method comprises a solvent mixture containing water and at least one organic solvent substantially immiscible with water. According to U.S. Pat. No. 3,460,961 and Eareckson, Journal of Polymer Science, vol. XL, pp. 399–406 (1959), preparation of resorcinol arylate polyesters with a mixture of iso- and terephthalate chain members is performed by an interfacial method in water and a water-immiscible solvent such as chloroform or dichloromethane using 1:1 stoichiometric ratio of resorcinol to either iso- or terephthaloyl dichloride, or a mixture thereof, in the presence of aqueous sodium hydroxide. The resorcinol is combined with the aqueous sodium hydroxide before addition of acid chlorides, and the reaction is run at pH which is initially high but which decreases as the reaction proceeds. The molecular weight of the polymers is not controlled. The method provides polymer with very high weight average molecular weight (Mw), making the polymer unsuitable for some applications. Furthermore, the polymer has poor thermal stability and loses molecular weight upon thermal treatment.

Multilayer articles containing layers made from resorcinol arylate-containing polyester have been described by Cohen et al., Journal of Polymer Science: Part A-1, vol. 9, 3263–3299 (1971) and in U.S. Pat. No. 3,460,961. The polyester was made either in solution or by an interfacial process. The solution method requires the use of a stoichiometric amount of an organic base, such as a tertiary amine, which must be isolated and recovered for reuse in any economical, environmentally friendly process. Both methods produce thermally unstable polyester which can only be applied by solution coating followed by evaporation of the solvent to make a multilayer article. This solution coating method has numerous deficiencies, some of which are mentioned in the Cohen et al. paper at page 3267: namely, the necessity to use high priced and toxic solvents, the inherently low concentration of the arylate polymer in the solvent and the tendency of the solutions to gel. Accordingly, the described polyesters were considered "unacceptable coating candidates".

Japanese Kokai 1/199,841 discloses articles having a substrate layer comprising at least 90 mole percent poly (ethylene terephthalate) and a gas barrier coating layer which is a polyester of resorcinol and a minimum of 50 mole % isophthalic acid, optionally with copolyester units derived from another dicarboxylic acid such as terephthalic acid, naphthalenedicarboxylic acid or various other specifically named dicarboxylic acids. The disclosed articles may be prepared by a series of operations including co-injection molding. However, the only types of articles disclosed are bottles, which are produced from a co-injection molded parison by subsequent blow molding. Larger articles, such as external automobile body parts, are not disclosed and no method for their production is suggested, nor are articles in which the substrate layer is anything other than poly (ethylene terephthalate). In addition, the resorcinol isophthalate polyesters were prepared either by melt methods which do not allow the incorporation of greater than 30 mole % terephthalate and give polyester with unacceptable color, or by the interfacial method which produces thermally unstable polyester.

It remains of interest, therefore, to develop a method for preparing weatherable, solvent resistant multilayer articles which are capable of use for such varied purposes as body parts for outdoor vehicles and devices such as automobiles. There is also a particular need for polymers comprising resorcinol arylate chain members having controlled molecular weight, high thermal stability, and low color. There is also a particular need for polymers comprising resorcinol arylate chain members that can be processed using typical melt processing techniques.

BRIEF SUMMARY OF THE INVENTION

The present inventors have identified the primary source of poor thermal stability in polymers comprising resorcinol arylate polyester chain members prepared by the interfacial method, and have discovered a method to prepare said polymers in thermally stable form with controlled molecular weight. The new method also allows the preparation of virtually colorless polymers comprising resorcinol arylate polyester chain members.

In one of its aspects the present invention provides an interfacial method for preparing polymers comprising resorcinol arylate polyester chain members substantially free of anhydride linkages linking at least two mers of the polymer chain, comprising the steps of:

(a) preparing an aqueous solution comprising at least one resorcinol moiety, said solution having a pH less than or equal to about 5;

(b) after step (a), preparing a mixture comprising the resorcinol moiety, at least one catalyst and at least one organic solvent substantially immiscible with water; and (c) adding to the mixture from (b) at least one dicarboxylic acid dichloride while maintaining the pH between 3 and 8.5 through the presence of an acid acceptor, wherein the total molar amount of acid chloride groups is stoichiometrically deficient relative to the total molar amount of phenolic groups.

In another of its aspects the invention provides a polymer consisting essentially of resorcinol arylate polyester chain members substantially free of anhydride linkages linking at least two mers of the polymer chain, prepared by an interfacial method comprising the above steps.

In yet another of its aspects the invention provides a copolymer consisting essentially of resorcinol arylate polyester chain members in combination with $C_{3-20}$ straight chain alkylene, $C_{3-10}$ branched alkylene, or $C_{4-10}$ cyclo- or bicycloalkylene chain members, substantially free of anhydride linkages linking at least two mers of the polymer chain, prepared by an interfacial method comprising the above steps.

In still another of its aspects the invention provides a copolymer consisting essentially of resorcinol arylate polyester chain members in combination with organic carbonate chain members, substantially free of anhydride linkages linking at least two mers of the polymer chain, prepared by an interfacial method, comprising the above steps.

DETAILED DESCRIPTION OF THE INVENTION

In one embodiment the present invention comprises an interfacial method for preparing thermally stable polymers comprising resorcinol arylate polyester chain members which derive their thermal stability in large part from being substantially free of anhydride linkages in the polymer chains. In another embodiment the present invention comprises the thermally stable polymers prepared by such an interfacial method.

Thermal stability within the context of the present invention refers to resistance of a polymer to molecular weight degradation under thermal conditions. Thus, a polymer with poor thermal stability shows significant molecular weight degradation under thermal conditions, such as during extrusion, molding, thermoforming, hot-pressing, and like conditions. Molecular weight degradation may also be manifest through color formation and/or in the degradation of other properties such as weatherability, gloss, mechanical properties, and/or thermal properties. Molecular weight degradation can also cause significant variation in processing conditions as the melt viscosity changes.

In one of its aspects the method of the present invention provides thermally stable polymers comprising arylate polyester chain members. Said chain members comprise at least one diphenol residue in combination with at least one aromatic dicarboxylic acid residue. The preferred diphenol residue, illustrated in Formula I, is derived from a 1,3-dihydroxybenzene moiety, commonly referred to throughout this specification as resorcinol or resorcinol moiety. Resorcinol or resorcinol moiety as used within the context of the present invention should be understood to include both unsubstituted 1,3-dihydroxybenzene and substituted 1,3-dihydroxybenzenes unless explicitly stated otherwise.

Formula I

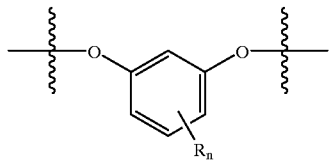

In Formula I R is at least one of $C_{1-12}$ alkyl or halogen, and n is 0–3.

Suitable dicarboxylic acid residues include aromatic dicarboxylic acid residues derived from monocyclic moieties, preferably isophthalic acid, terephthalic acid, or mixtures of isophthalic and terephthalic acids, or from polycyclic moieties, including diphenyl dicarboxylic acid, diphenylether dicarboxylic acid, and naphthalenedicarboxylic acid, preferably naphthalene-2,6-dicarboxylic acid. Preferably, the aromatic dicarboxylic acid residues are derived from mixtures of isophthalic and/or terephthalic acids as typically illustrated in Formula II.

Formula II

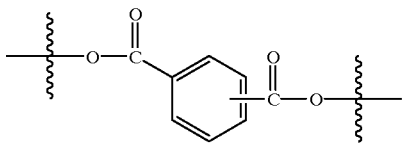

Therefore, in one embodiment the present invention provides thermally stable polymers comprising resorcinol arylate polyester chain members as typically illustrated in Formula III wherein R and n are as previously defined:

Formula III

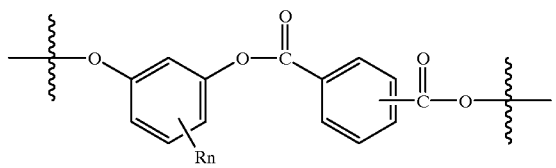

Previous interfacial methods for preparing polyesters comprising resorcinol arylate chain members typically provide polymers with poor thermal stability and uncontrolled molecular weight. The present inventors have discovered that a primary reason for poor thermal stability is the presence of anhydride linkages in the backbone of the polyester chain. Typical anhydride linkages are illustrated in Formula IV. Such anhydride linkages link at least two mers in a polymer chain and may arise through combination of two isophthalate or terephthalate moieties or mixtures thereof, although it is to be understood that anhydride linkages in polymers comprising resorcinol arylate chain members may arise through combination of any suitable similar dicarboxylic acid residues or mixtures of suitable dissimilar dicarboxylic acid residues present in a reaction mixture.

Formula IV

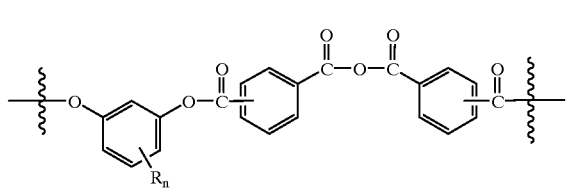

Although the invention is not limited by theory, it is believed that the anhydride linkage represents a weak bond in the polyester chain, which can break under thermal processing conditions to produce shorter chains terminated by acid end-groups. These acid end-groups, in turn, may accelerate the hydrolysis of the arylate moiety, generating additional carboxyl and hydroxyl end-groups, and further contributing to the molecular weight degradation, and loss in other desirable properties. Anhydride linkages may arise through several mechanisms. In one mechanism a carboxylic acid chloride may be hydrolyzed to carboxylic acid when the esterification reaction is run at high pH. The carboxylic acid or corresponding carboxylate may then react with another carboxylic acid chloride to yield an anhydride linkage.

Anhydride linkages may be detected by means known to those skilled in the art such as by $^{13}C$ nuclear magnetic resonance spectroscopy (NMR). For example, resorcinol arylate polyesters comprising dicarboxylic acid residues derived from a mixture of iso- and terephthalic acids typically show $^{13}C$ NMR resonances attributed to anhydride at 161.0 and 161.1 ppm (in deuterochloroform relative to tetramethylsilane), as well as resonances for the polymer carboxylic acid and hydroxyl end-groups. After thermal processing (for example, extrusion and/or molding), the polymer molecular weight decreases, and the anhydride resonances typically decrease, while those of the acid and hydroxyl end-groups typically increase.

Anhydride linkages in polymers comprising resorcinol arylate polyester chain members may also be detected by reaction of polymer with a nucleophile, such as a secondary amine. For example, resorcinol arylate polyesters comprising dicarboxylic acid residues derived from a mixture of iso- and terephthalic acids can be dissolved in a convenient solvent, such as dichloromethane, and treated with a secondary amine, such as dibutylamine or diisobutylamine, for several minutes at ambient temperature. Comparison of the starting polymer molecular weight to that after amine treatment typically shows a decrease in molecular weight which can be correlated with the corresponding decrease observed under typical thermal processing conditions. Although the invention is not meant to be limited by theory, it is believed that nucleophiles, such as secondary amine and phenolic, attack anhydride linkages (as opposed to ester linkages) selectively under the reaction conditions. The decrease in molecular weight upon reaction with amine nucleophile is therefore an indication of the presence of anhydride functionality in the polymer.

In one of its aspects the present invention provides an interfacial method for preparing polymers comprising resorcinol arylate polyester chain members substantially free of anhydride linkages, said method comprising a first step of combining at least one resorcinol moiety and at least one catalyst in a mixture of water and at least one organic solvent substantially immiscible with water. Suitable resorcinol moieties comprise units of Formula V:

Formula V

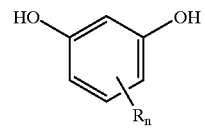

wherein R is at least one of $C_{1-12}$ alkyl or halogen, and n is 0–3. Alkyl groups, if present, are preferably straight-chain or branched alkyl groups, and are most often located in the ortho position to both oxygen atoms although other ring locations are contemplated. Suitable $C_{1-12}$ alkyl groups include methyl, ethyl, n-propyl, isopropyl, butyl, iso-butyl, t-butyl, nonyl, decyl, and aryl-substituted alkyl, including benzyl, with methyl being particularly preferred. Suitable halogen groups are bromo, chloro, and fluoro. The value for n may be 0–3, preferably 0–2, and more preferably 0–1. A preferred resorcinol moiety is 2-methylresorcinol. The most preferred resorcinol moiety is an unsubstituted resorcinol moiety in which n is zero.

In one embodiment a resorcinol moiety is added to a reaction mixture as an aqueous solution. The present inventors have discovered that aqueous solutions containing a resorcinol moiety such as unsubstituted resorcinol discolor with time. Although the invention is not dependent upon theory, it is believed that at least some color formation in solution may result from oxidation of resorcinol moiety species. When a discolored solution comprising resorcinol moiety is employed in synthesis of polymers of the present invention, the product polymers may be darker in color than desired, making said polymers unsuitable for use in many applications. It has been discovered that aqueous solutions comprising resorcinol moiety may be inhibited from discoloration by providing a pH in one embodiment of about 5 or less in the aqueous solution, in another embodiment of about 4 or less in the aqueous solution, and in still another embodiment of about 3 or less in the aqueous solution. In one embodiment when an aqueous solution comprising resorcinol moiety at a pH of about 5 or less is employed in synthesis of polymers of the present invention, the product polymers are typically lighter in color than corresponding polymers prepared using an aqueous solution comprising resorcinol moiety without added acid. In another embodiment when an aqueous solution comprising resorcinol moiety at a pH of about 5 or less is employed in synthesis of polymers of the present invention, the product polymers are typically lighter in color than corresponding polymers prepared using an aqueous solution comprising resorcinol moiety wherein the pH of the aqueous solution is greater than about 5. Color can be determined by visual observation or by other methods known to those skilled in the art, such as spectroscopic methods.

The amount of water present in a solution comprising water and at least one resorcinol moiety is in one embodiment in a range of between about 0.5 wt % and about 70 wt %, in another embodiment in a range of between about 0.5 wt % and about 30 wt %, in another embodiment in a range of between about 1 wt % and about 25 wt %, in another embodiment in a range of between about 2 wt % and about 20 wt %, and in still another embodiment in a range of between about 5 wt % and about 15 wt %. In one particular embodiment amount of water present in a solution comprising water and at least one resorcinol moiety is in a range of between about 50 wt % and about 60 wt %.

The pH of about 5 or less may be provided in some embodiments using at least one inorganic acid or at least one organic acid, or at least one of an inorganic in combination with at least one of an organic acid. In various embodiments inorganic acids comprise hydrochloric acid, phosphoric acid, phosphorous acid, sulfuric acid, and mixtures thereof. In various embodiments organic acids comprise organic sulfonic acids, methanesulfonic acid, p-toluenesulfonic acid, sulfonic acid-functionalized ion exchange resins, organic carboxylic acids, lactic acid, malic acid, glyceric acid, oxalic acid, citric acid, tartaric acid, glycolic acid, thioglycolic acid, tartronic acid, acetic acid, halogenated acetic acids, monochloroacetic acid, dichloroacetic acid, trichloroacetic acid, propionic acid, gluconic acid, ascorbic acid, and mixtures thereof. In some embodiments gluconic acid may be particularly beneficial because of its iron complexing ability and lack of corrosive properties compared to certain other acids.

In other embodiments an aqueous solution with a pH of 5 or less may be provided using a recycle water stream derived from washing an organic solution comprising a polymer with an aqueous solution comprising acid. In a particular embodiment the recycle water stream is derived from washing an organic solution comprising a condensation polymer and at least one salt, such as an alkali metal halide. In another particular embodiment the recycle water stream is derived from washing an organic solution comprising bisphenol A polycarbonate polymer with an aqueous acidic solution. In another particular embodiment the recycle water stream is derived from washing an organic solution comprising a resorcinol arylate-comprising polymer with an aqueous acidic solution. In another particular embodiment the recycle water stream is derived from washing an organic solution comprising a copolyestercarbonate comprising resorcinol arylate-structural units with an aqueous acidic solution. In various embodiments suitable recycle water streams may comprise at least one alkali metal halide, such as, but not limited to, sodium chloride, sodium fluoride, potassium chloride, or potassium fluoride. In other embodiments suitable recycle water streams may comprise at least one amine salt, such as a trialkylamine hydrochloride salt. In some embodiments amine salts are derived from trialkylamines described hereinbelow. In various embodiments suitable recycle water streams comprise both of at least one alkali metal halide and at least one amine salt. In particular embodiments suitable recycle water streams comprise triethylamine hydrochloride and sodium chloride. In other embodiments suitable recycle water streams may comprise at least one amine salt which is a quaternary ammonium salt, quaternary phosphonium salt, or hexaalkylguanidinium salt. In some embodiments suitable quaternary ammonium salts, quaternary phosphonium salts, or hexaalkylguanidinium salts are those described hereinbelow. An aqueous solution comprising resorcinol moiety in recycle water has in one embodiment a pH less than or equal to about 5, in another embodiment a pH less than or equal to about 4, in another embodiment a pH less than or equal to about 3, in another embodiment a pH in a range of between about 1 and about 3, in another embodiment a pH in a range of between about 1 and about 2, and in still another embodiment a pH in a range of between about 1 and about 1.6.

In embodiments wherein the recycle water comprises at least one member selected from the group consisting of an amine salt, a trialkylamine hydrochloride salt, a quaternary ammonium salt, a quaternary phosphonium salt, and hexaalkylguanidinium salt, then in one embodiment the recycle water solution may serve as the source of at least a portion of the total amount of these species when said species are required as catalysts in the polymerization process. In other embodiments the recycle water solution may serve as the source of the total amount of these species when these species are required as catalysts. In a particular embodiment a recycle water stream is analyzed for the catalyst species involved, and, if necessary, additional catalyst species is added or the recycle water is diluted with water to adjust the total amount of catalyst species so that the catalyst species in the reaction mixture is derived from the recycle water. In particular embodiments analysis and optional concentration adjustment are done before using the recycle water to prepare a solution comprising resorcinol moiety.

Aqueous solutions comprising resorcinol moiety and acid or an acidic recycle water stream may be prepared before use and, if so desired, stored for a period of time. Said solutions may be at essentially room temperature or at a temperature above room temperature. In one embodiment solutions of a resorcinol moiety comprising water may be at a temperature above the melting point of the resorcinol moiety, for example at a temperature above the melting point of unsubstituted resorcinol. Those skilled in the art will recognize that an aqueous composition comprising resorcinol moiety and components of a recycle water stream may be prepared and used in polymerization reactions even though said aqueous composition without resorcinol moiety was not actually used to wash an organic solution comprising a polymer.

In another embodiment a resorcinol moiety may be added to a reaction mixture in a molten state. In a particular embodiment said resorcinol moiety may comprise water. In another particular embodiment said resorcinol moiety comprises water and at least one inorganic acid or at least one organic acid, or at least one of an inorganic in combination with at least one of an organic acid. In another particular embodiment said resorcinol moiety is essentially free of water and comprises at least one inorganic acid or at least one organic acid, or at least one of an inorganic in combination with at least one of an organic acid. Both types of acids may be selected from those disclosed above. In some embodiments organic acids may be selected due to their lower corrosive properties. In the present context essentially free of water means that the water present is that adventitiously obtained, for example through adsorption from the environment. In some embodiments essentially free of water means that the resorcinol moiety comprises less than about 0.5 wt % water. The amount of acid which may be present when resorcinol moiety is added to a reaction mixture in the molten state is an amount sufficient to retard color formation over any time period compared to a corresponding composition comprising resorcinol moiety without added acid. In various embodiments the amount of acid which may be present is in one embodiment in a range of between about 0.1 ppm and about 100,000 ppm, in another embodiment in a range of between about 1 ppm and about 10,000 ppm, in another embodiment in a range of between about 10 ppm and about 8,000 ppm, in another embodiment in a range of between about 50 ppm and about 4,000 ppm, and in still another embodiment in a range of between about 100 ppm and about 3,000 ppm.

The method further comprises combining at least one catalyst with the reaction mixture. Said catalyst may be present at a total level of 0.1 to 10 mole %, and preferably 0.2 to 6 mole % based on total molar amount of acid chloride groups. Suitable catalysts comprise tertiary amines, quaternary ammonium salts, quaternary phosphonium salts, hexaalkylguanidinium salts, and mixtures thereof. Suitable tertiary amines include triethylamine, dimethylbutylamine, diisopropylethylamine, 2,2,6,6-tetramethylpiperidine, and mixtures thereof. Other contemplated tertiary amines include N-$C_1$–$C_6$-alkyl-pyrrolidines, such as N-ethylpyrrolidine, N-$C_1$–$C_6$-piperidines, such as N-ethylpiperidine, N-methylpiperidine, and N-isopropylpiperidine, N-$C_1$–$C_6$-morpholines, such as N-ethylmorpholine and N-isopropyl-morpholine, N-$C_1$–$C_6$-dihydroindoles, N-$C_1$–$C_6$-dihydroisoindoles, N-$C_1$–$C_6$-tetrahydroquinolines, N-$C_1$–$C_6$-tetrahydroisoquinolines, N-$C_1$–$C_6$-benzo-morpholines, 1-azabicyclo-[3.3.0]-octane, quinuclidine, N-$C_1$–$C_6$-alkyl-2-azabicyclo-[2.2.1]-octanes, N-$C_1$–$C_6$-alkyl-2-azabicyclo-[3.3.1 ]-nonanes, and N-$C_1$–$C_6$-alkyl-3-azabicyclo-[3.3.1]-nonanes, N,N,N',N'-tetraalkylalkylene-diamines, including N,N,N',N'-tetraethyl-1,6-hexanediamine. Particularly preferred tertiary amines are triethylamine and N-ethylpiperidine.

When the catalyst consists of at least one tertiary amine alone, then said catalyst may be present at a total level of 0.1 to 10 mole %, preferably 0.2 to 6 mole %, more preferably 1 to 4 mole %, and most preferably 2.5 to 4 mole % based on total molar amount of acid chloride groups. In one embodiment of the invention all of the at least one tertiary amine is present at the beginning of the reaction before addition of dicarboxylic acid dichloride to resorcinol moiety. In another embodiment a portion of any tertiary amine is present at the beginning of the reaction and a portion is added following or during addition of dicarboxylic acid dichloride to resorcinol moiety. In this latter embodiment the amount of any tertiary amine initially present with resorcinol moiety may range from about 0.005 wt. % to about 10 wt. %, preferably from about 0.01 to about 1 wt. %, and more preferably from about 0.02 to about 0.3 wt. % based on total amine.

Suitable quaternary ammonium salts, quaternary phosphonium salts, and hexaalkylguanidinium salts include halide salts such as tetraethylammonium bromide, tetraethylammonium chloride, tetrapropylammonium bromide, tetrapropylammonium chloride, tetrabutylammonium bromide, tetrabutylammonium chloride, methyltributylammonium chloride, benzyltributylammonium chloride, benzyltriethylammonium chloride, benzyltrimethylammonium chloride, trioctylmethylammonium chloride, cetyldimethylbenzylammonium chloride, octyltriethylammonium bromide, decyltriethylammonium bromide, lauryltriethylammonium bromide, cetyltrimethylammonium bromide, cetyltriethylammonium bromide, N-laurylpyridinium chloride, N-laurylpyridinium bromide, N-heptylpyridinium bromide, tricaprylylmethylammonium chloride (sometimes known as ALIQUAT 336), methyltri-$C_8$–$C_{10}$-alkyl-ammonium chloride (sometimes known as ADOGEN 464), N,N,N',N',N'-pentaalkyl-alpha, omega-amine-ammonium salts such as disclosed in U.S. Pat. No. 5,821,322; tetrabutylphosphonium bromide, benzyltriphenylphosphonium chloride, triethyloctadecylphosphonium bromide, tetraphenylphosphonium bromide, triphenylmethylphosphonium bromide, trioctylethylphosphonium bromide, cetyltriethylphosphonium bromide, hexaalkylguanidinium halides, hexaethylguanidinium chloride, and the like, and mixtures thereof.

Organic solvents substantially immiscible with water include those which are less than about 5 wt. %, and preferably less than about 2 wt. % soluble in water under the reaction conditions. Suitable organic solvents include dichloromethane, trichloroethylene, tetrachloroethane, chloroform, 1,2-dichloroethane, toluene, xylene, trimethylbenzene, chlorobenzene, o-dichlorobenzene, and mixtures thereof. An especially preferred solvent is dichloromethane.

Suitable dicarboxylic acid dichlorides comprise aromatic dicarboxylic acid dichlorides derived from monocyclic moieties, preferably isophthaloyl dichloride, terephthaloyl dichloride, or mixtures of isophthaloyl and terephthaloyl dichlorides, or from polycyclic moieties, including diphenyl dicarboxylic acid dichloride, diphenylether dicarboxylic acid dichloride, and naphthalenedicarboxylic acid dichloride, preferably naphthalene-2,6-dicarboxylic acid dichloride; or from mixtures of monocyclic and polycyclic aromatic dicarboxylic acid dichlorides. Preferably, the dicarboxylic acid dichloride comprises mixtures of isophthaloyl and/or terephthaloyl dichlorides as typically illustrated in Formula VI.

Formula VI

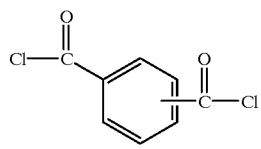

Either or both of isophthaloyl and terephthaloyl dichlorides may be present. In especially preferred embodiments the dicarboxylic acid dichlorides comprise mixtures of isophthaloyl and terephthaloyl dichloride in a molar ratio of isophthaloyl to terephthaloyl of about 0.25–4.0:1, preferably about 0.4–2.5:1, and more preferably about 0.67–1.5:1.

The pH of the reaction mixture is maintained between about 3 and about 8.5, and preferably between about 5 and about 8, throughout addition of the at least one dicarboxylic acid dichloride to the at least one resorcinol moiety. Suitable reagents to maintain the pH include alkali metal hydroxides, alkaline earth hydroxides, and alkaline earth oxides. Preferred reagents are potassium hydroxide and sodium hydroxide. A particularly preferred reagent is sodium hydroxide. The reagent to maintain pH may be included in the reaction mixture in any convenient form. Preferably, said reagent is added to the reaction mixture as an aqueous solution simultaneously with the at least one dicarboxylic acid dichloride.

The temperature of the reaction mixture may be any convenient temperature that provides a rapid reaction rate and a resorcinol arylate-containing polymer substantially free of anhydride linkages. Convenient temperatures include those from about −20° C. to the boiling point of the water-organic solvent mixture under the reaction conditions. In a preferred embodiment the reaction is performed at the boiling point of the organic solvent in the water-organic solvent mixture. In an especially preferred embodiment the reaction is performed at the boiling point of dichloromethane.

The total molar amount of acid chloride groups added to the reaction mixture is stoichiometrically deficient relative to the total molar amount of phenolic groups. Said stoichiometric ratio is desirable so that hydrolysis of acid chloride groups is minimized, and so that nucleophiles such as phenolic and/or phenoxide may be present to destroy any adventitious anhydride linkages, should any form under the reaction conditions. The total molar amount of acid chloride groups includes the at least one dicarboxylic acid dichloride, and any mono-carboxylic acid chloride chain-stoppers and any tri- or tetra-carboxylic acid tri- or tetra-chloride branching agents which may be used. The total molar amount of phenolic groups includes resorcinol moieties, and any mono-phenolic chain-stoppers and any tri- or tetra-phenolic branching agents which may be used. The stoichiometric ratio of total phenolic groups to total acid chloride groups is preferably about 1.5–1.01:1 and more preferably about 1.2–1.02:1.

The presence or absence of adventitious anhydride linkages following complete addition of the at least one dicarboxylic acid dichloride to the at least one resorcinol moiety will typically depend upon the exact stoichiometric ratio of reactants and the amount of catalyst present, as well as other variables. For example, if a sufficient molar excess of total phenolic groups is present, anhydride linkages are often found to be absent. Often a molar excess of at least about 1% and preferably at least about 3% of total amount of phenolic groups over total amount of acid chloride groups may suffice to eliminate anhydride linkages under the reaction conditions. When anhydride linkages may be present, it is often desirable that the final pH be greater than 7 so that nucleophiles such as phenolic, phenoxide and/or hydroxide may be present to destroy any adventitious anhydride linkages. Therefore, in one of its embodiments the method of the invention may further comprise the step of adjusting the pH of the reaction mixture to between 7 and 12, preferably to between 8 and 12, and more preferably to between 8.5 and 12, following complete addition of the at least one dicarboxylic acid dichloride to the at least one resorcinol moiety. The pH may be adjusted by any convenient method, preferably using an aqueous base such as aqueous sodium hydroxide.

Provided the final pH of the reaction mixture is greater than 7, the method of the invention in another embodiment may further comprise the step of stirring the reaction mixture for a time sufficient to destroy completely any adventitious anhydride linkages, should any be present. The necessary stirring time will depend upon reactor configuration, stirrer geometry, stirring rate, temperature, total solvent volume, organic solvent volume, anhydride concentration, pH, and other factors. In some instances the necessary stirring time is essentially instantaneous, for example within seconds of pH adjustment to above 7, assuming any adventitious anhydride linkages were present to begin with. For typical laboratory scale reaction equipment a stirring time of at least about 3 minutes, and preferably at least about 5 minutes may be required. By this process nucleophiles, such as phenolic, phenoxide and/or hydroxide, may have time to destroy completely any adventitious anhydride linkages, should any be present.

At least one chain-stopper (also referred to sometimes hereinafter as capping agent) may also be present in the method and compositions of the invention. A purpose of adding at least one chain-stopper is to limit the molecular weight of polymer comprising resorcinol arylate polyester chain members, thus providing polymer with controlled molecular weight and favorable processability. Typically, at least one chain-stopper is added when the resorcinol arylate-containing polymer is not required to have reactive end-groups for further application. In the absence of chain-stopper resorcinol arylate-containing polymer may be either used in solution or recovered from solution for subsequent use such as in copolymer formation which may require the presence of reactive end-groups, typically hydroxy, on the resorcinol-arylate polyester segments. A chain-stopper may be at least one of mono-phenolic compounds, mono-carboxylic acid chlorides, and/or mono-chloroformates. Typically, the at least one chain-stopper may be present in quantities of 0.05 to 10 mole %, based on resorcinol moieties in the case of mono-phenolic compounds and based on acid dichlorides in the case mono-carboxylic acid chlorides and/or mono-chloroformates.

Suitable mono-phenolic compounds include monocyclic phenols, such as phenol, $C_1$–$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms, preferably in which about 47 to 89% of the hydrogen atoms are part of methyl groups as described in U.S. Pat. No. 4,334,053. For some embodiments the use of a mono-phenolic UV screener as capping agent is preferred. Such compounds include 4-substituted-2-hydroxybenzophenones and their derivatives, aryl salicylates, monoesters of diphenols, such as resorcinol monobenzoate, 2-(2-hydroxyaryl)-benzotriazoles and their derivatives, 2-(2-hydroxyaryl)-1,3,5-triazines and their derivatives, and like compounds. Especially preferred mono-phenolic chain-stoppers are phenol, p-cumylphenol, and resorcinol monobenzoate.

Suitable mono-carboxylic acid chlorides include monocyclic, mono-carboxylic acid chlorides, such as benzoyl chloride, $C_1$–$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides, such as trimellitic anhydride chloride, and naphthoyl chloride; and mixtures of monocyclic and polycyclic mono-carboxylic acid chlorides. The chlorides of aliphatic monocarboxylic acids with up to 22 carbon atoms are also suitable. Functionalized chlorides of aliphatic monocarboxylic acids, such as acryloyl chloride and methacryoyl chloride, are also suitable. Suitable mono-chloroformates include monocyclic, mono-chloroformates, such as phenyl chloroformate, alkyl-substituted phenyl chloroformate, p-cumyl phenyl chloroformate, toluene chloroformate, and mixtures thereof.

A chain-stopper can be combined together with the resorcinol moieties, can be contained in the solution of dicarboxylic acid dichlorides, or can be added to the reaction mixture after production of a precondensate. If mono-carboxylic acid chlorides and/or mono-chloroformates are used as chain-stoppers, they are preferably introduced together with dicarboxylic acid dichlorides. These chain-stoppers can also be added to the reaction mixture at a moment when the chlorides of dicarboxylic acid have already reacted substantially or to completion. If phenolic compounds are used as chain-stoppers, they can be added to the reaction mixture during the reaction, or, more preferably, before the beginning of the reaction between resorcinol moiety and acid chloride moiety. When hydroxy-terminated resorcinol arylate-containing precondensate or oligomers are prepared, then chain-stopper may be absent or only present in small amounts to aid control of oligomer molecular weight.

In another embodiment the invention may encompass the inclusion of at least one branching agent such as a trifunctional or higher functional carboxylic acid chloride and/or trifunctional or higher functional phenol. Such branching agents, if included, can preferably be used in quantities of 0.005 to 1 mole %, based on dicarboxylic acid dichlorides or resorcinol moieties used, respectively. Suitable branching agents include, for example, trifunctional or higher carboxylic acid chlorides, such as trimesic acid trichloride, cyanuric acid trichloride, 3,3',4,4'-benzophenone tetracarboxylic acid tetrachloride, 1,4,5,8-naphthalene tetracarboxylic acid tetrachloride or pyromellitic acid tetrachloride, and trifunctional or higher phenols, such as phloroglucinol, 4,6-dimethyl-2, 4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methyl phenol, 2-(4-hydroxyphenyl)-2-(2,4-dihydroxyphenyl)-propane, tetra-(4-[4-hydroxyphenylisopropyl]-phenoxy)-methane, 1,4-bis-[(4,4-dihydroxytriphenyl)methyl]-benzene. Phenolic branching agents may be introduced first with the resorcinol moieties whilst acid chloride branching agents may be introduced together with acid dichlorides.

For some applications such as for copolymer formation the resorcinol arylate-containing polymer may remain in solution for subsequent process steps. In other instances such as in the production of resorcinol arylate polyester the polymer will normally be isolated from solution. Therefore, in another embodiment of the invention the resorcinol arylate-containing polymer is recovered from the reaction mixture. Recovery methods are well known to those skilled in the art and may include such steps as acidification of the mixture, for example with phosphorous acid; subjecting the mixture to liquid-liquid phase separation; washing the organic phase with water and/or a dilute acid such as hydrochloric acid or phosphoric acid; precipitating by usual methods such as through treatment with water or anti-solvent precipitation with, for example, methanol, ethanol, and/or isopropanol; isolating the resulting precipitates; and drying to remove residual solvents.

If desired, the resorcinol arylate polymers of the invention may be made by the present method further comprising the addition of a reducing agent. Suitable reducing agents include, for example, sodium sulfite, sodium gluconate, or a borohydride, such as sodium borohydride. When present, any reducing agents are typically used in quantities of from 0.25 to 2 mole %, based on moles of resorcinol moiety.

In one of its embodiments the invention comprises thermally stable resorcinol arylate polyesters made by the present method and substantially free of anhydride linkages linking at least two mers of the polyester chain. In a particular embodiment said polyesters comprise dicarboxylic acid residues derived from a mixture of iso- and terephthalic acids as illustrated in Formula VII:

Formula VII

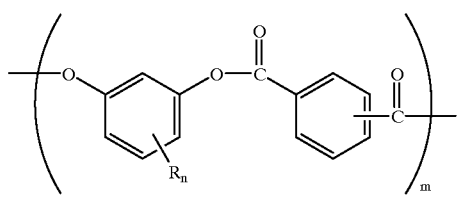

wherein R is at least one of $C_{1-12}$ alkyl or halogen, n is 0–3, and m is at least about 8. Preferably, n is zero and m is between about 10 and about 300. The molar ratio of isophthalate to terephthalate is about 0.25–4.0:1, preferably about 0.4–2.5:1, and more preferably about 0.67–1.5:1. Substantially free of anhydride linkages means that said polyesters show decrease in molecular weight of less than 30% and preferably less than 10% upon heating said polymer at a temperature of about 280–290° C. for five minutes.

The present invention also encompasses thermally stable copolymers containing segments comprising resorcinol arylate polyester chain members made by the present method and substantially free of anhydride linkages linking at least two mers of the copolymer chain. Thus, in another of its embodiments the present invention comprises thermally stable copolyesters comprising resorcinol arylate polyester chain members in combination with dicarboxylic acid or diol alkylene chain members (so-called "soft-block" segments), said copolyesters being substantially free of anhydride linkages in the polyester segments. Substantially free of anhydride linkages means that the copolyesters show decrease in molecular weight of less than 10% and preferably less than 5% upon heating said copolyester at a temperature of about 280–290° C. for five minutes. Related copolyesters containing soft-block segments are disclosed in commonly owned U.S. Pat. No. 5,916,997.

The term soft-block as used herein, indicates that some segments of the polymers are made from non-aromatic monomer units. Such non-aromatic monomer units are generally aliphatic and are known to impart flexibility to the soft-block-containing polymers. The copolymers include those comprising structural units of Formulas I, VIII, and IX:

Formula I

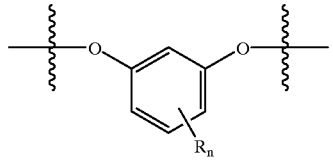

Formula VIII

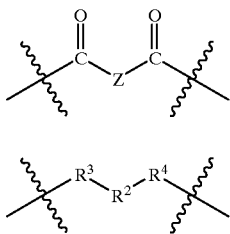

Formula IX

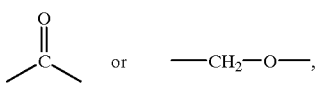

wherein R and n are as previously defined, Z is a divalent aromatic radical, $R^2$ is a $C_{3-20}$ straight chain alkylene, $C_{3-10}$ branched alkylene, or $C_{4-10}$ cyclo- or bicycloalkylene group, and $R^3$ and $R^4$ each independently represent

 or —CH$_2$—O—, wherein Formula IX contributes from about 1 to about 45 mole percent to the ester linkages of the polyester. Additional embodiments of the present invention provide a composition wherein Formula IX contributes from about 5 to about 40 mole percent to the ester linkages of the polyester, with about 5 to about 20 mole percent being particularly preferred. Another embodiment provides a composition wherein $R^2$ represents $C_{3-4}$ straight chain alkylene, or $C_{5-6}$ cycloalkylene, with a preferred composition being one wherein $R^2$ represents $C_{3-10}$ straight-chain alkylene or $C_6$-cycloalkylene. Formula VIII represents an aromatic dicarboxylic acid residue. The divalent aromatic radical Z in Formula VIII may be derived form at least one of the suitable dicarboxylic acid residues as defined hereinabove, and preferably at least one of 1,3-phenylene, 1,4-phenylene, or 2,6-naphthylene. In more preferred embodiments Z comprises at least about 40 mole percent 1,3-phenylene. In preferred embodiments of copolyesters containing soft-block chain members n in Formula I is zero.

Preferred copolyesters containing resorcinol arylate chain members are those comprising from about 1 to about 45 mole % sebacate or cyclohexane-1,4-dicarboxylate units. A particularly preferred copolyester containing resorcinol arylate chain members is one comprising resorcinol isophthalate and resorcinol sebacate units in molar ratio between 8.5:1.5 and 9.5:0.5. In a preferred procedure said preferred copolyester is prepared using sebacoyl chloride in combination with isophthaloyl dichloride.

In another of its embodiments the present invention comprises thermally stable block copolyestercarbonates comprising resorcinol arylate-containing block segments in combination with organic carbonate block segments. The segments comprising resorcinol arylate chain members in such copolymers are substantially free of anhydride linkages. Substantially free of anhydride linkages means that the copolyestercarbonates show decrease in molecular weight of less than 10% and preferably less than 5% upon heating said copolyestercarbonate at a temperature of about 280–290° C. for five minutes. Related block copolyestercarbonates are disclosed in commonly owned, co-pending application Ser. No. 09/416,529, filed Oct. 12, 1999.

The block copolyestercarbonates include those comprising alternating arylate and organic carbonate blocks, typically as illustrated in Formula X, wherein R and n are as previously defined, and $R^5$ is at least one divalent organic radical:

Formula X

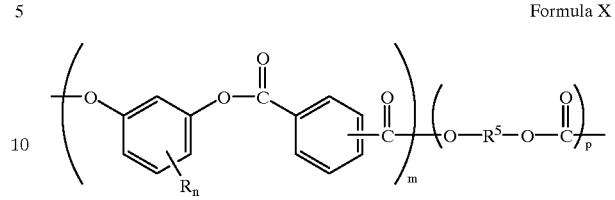

The arylate blocks have a degree of polymerization (DP), represented by m, of at least about 4, preferably at least about 10, more preferably at least about 20 and most preferably about 30–150. The DP of the organic carbonate blocks, represented by p, is generally at least about 10, preferably at least about 20 and most preferably about 50–200. The distribution of the blocks may be such as to provide a copolymer having any desired weight proportion of arylate blocks in relation to carbonate blocks. In general, the content of arylate blocks is preferably about 10–95% by weight and more preferably about 50–95% by weight.

Although a mixture of iso- and terephthalate is illustrated in Formula X, the dicarboxylic acid residues in the arylate blocks may be derived from any suitable dicarboxylic acid residue, as defined hereinabove, or mixture of suitable dicarboxylic acid residues, including those derived from aliphatic diacid dichlorides (so-called "soft-block" segments). In preferred embodiments n is zero and the arylate blocks comprise dicarboxylic acid residues derived from a mixture of iso- and terephthalic acid residues, wherein the molar ratio of isophthalate to terephthalate is about 0.25–4.0:1, preferably about 0.4–2.5:1, and more preferably about 0.67–1.5:1.

In the organic carbonate blocks, each $R^5$ is independently a divalent organic radical. Preferably, said radical comprises at least one dihydroxy-substituted aromatic hydrocarbon, and at least about 60 percent of the total number of $R^5$ groups in the polymer are aromatic organic radicals and the balance thereof are aliphatic, alicyclic, or aromatic radicals. Suitable $R^5$ radicals include m-phenylene, p-phenylene, 4,4'-biphenylene, 4,4'-bi(3,5-dimethyl)-phenylene, 2,2-bis (4-phenylene)propane, 6,6'-(3,3,3', 3'-tetramethyl-1,1'-spirobi[1H-indan]) and similar radicals such as those which correspond to the dihydroxy-substituted aromatic hydrocarbons disclosed by name or formula (generic or specific) in U.S. Pat. No. 4,217,438.

More preferably, each $R^5$ is an aromatic organic radical and still more preferably a radical of Formula XI:

—A$^1$—Y—A$^2$—     Formula XI wherein each $A^1$ and $A^2$ is a monocyclic divalent aryl radical and Y is a bridging radical in which one or two carbon atoms separate $A^1$ and $A^2$. The free valence bonds in Formula XI are usually in the meta or para positions of $A^1$ and $A^2$ in relation to Y. Compounds in which $R^5$ has Formula XI are bisphenols, and for the sake of brevity the term "bisphenol" is sometimes used herein to designate the dihydroxy-substituted aromatic hydrocarbons. It should be understood, however, that non-bisphenol compounds of this type may also be employed as appropriate.

In Formula XI, $A^1$ and $A^2$ typically represent unsubstituted phenylene or substituted derivatives thereof, illustrative substituents (one or more) being alkyl, alkenyl, and halogen (particularly bromine). Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, separate $A^1$ from $A^2$. The preferred embodiment is one in which one atom separates $A^1$ from $A^2$. Illustrative radicals of this type are —O—, —S—, —SO— or —SO$_2$—, methylene, cyclohexyl methylene, 2-[2.2.1]-bicycloheptyl methylene, ethylene, isopropylidene, neopentylidene, cyclohexylidene, cyclopentadecylidene, cyclododecylidene, adamantylidene, and like radicals.

Gem-alkylene (commonly known as "alkylidene") radicals are preferred. Also included, however, are unsaturated radicals. For reasons of availability and particular suitability for the purposes of this invention, the preferred bisphenol is 2,2-bis(4-hydroxyphenyl)propane (bisphenol-A or BPA), in which Y is isopropylidene and $A^1$ and $A^2$ are each p-phenylene. Depending upon the molar excess of resorcinol moiety present in the reaction mixture, $R^5$ in the carbonate blocks may at least partially comprise resorcinol moiety. In other words, in some embodiments of the invention carbonate blocks of Formula X may comprise a resorcinol moiety in combination with at least one other dihydroxy-substituted aromatic hydrocarbon.

Diblock, triblock, and multiblock copolyestercarbonates are encompassed in the present invention. The chemical linkages between blocks comprising resorcinol arylate chain members and blocks comprising organic carbonate chain members may comprise at least one of (a) an ester linkage between a suitable dicarboxylic acid residue of an arylate moiety and an —O—$R^5$—O— moiety of an organic carbonate moiety, for example as typically illustrated in Formula XII, wherein $R^5$ is as previously defined:

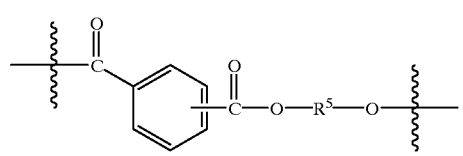

Formula XII and (b) a carbonate linkage between a diphenol residue of a resorcinol arylate moiety and a —(C=O)—O— moiety of an organic carbonate moiety as shown in Formula XIII, wherein R and n are as previously defined:

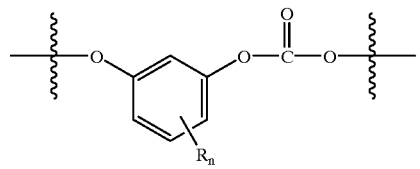

Formula XIII

The presence of a significant proportion of ester linkages of the type (a) may result in undesirable color formation in the copolyestercarbonates. Although the invention is not limited by theory, it is believed that color may arise, for example, when $R^5$ in Formula XII is bisphenol A and the moiety of Formula XII undergoes Fries rearrangement during subsequent processing and/or light-exposure. In a preferred embodiment the copolyestercarbonate is substantially comprised of a diblock copolymer with a carbonate linkage between resorcinol arylate block and an organic carbonate block. In a more preferred embodiment the copolyestercarbonate is substantially comprised of a triblock carbonate-ester-carbonate copolymer with carbonate linkages between the resorcinol arylate block and organic carbonate endblocks.

Copolyestercarbonates with at least one carbonate linkage between a thermally stable resorcinol arylate block and an organic carbonate block are typically prepared from resorcinol arylate-containing oligomers prepared by various embodiments of the invention and containing at least one and preferably two hydroxy-terminal sites. Said oligomers typically have weight average molecular weight of about 10,000 to about 40,000, and more preferably about 15,000 to about 30,000. Thermally stable copolyestercarbonates may be prepared by reacting said resorcinol arylate-containing oligomers with phosgene, at least one chain-stopper, and at least one dihydroxy-substituted aromatic hydrocarbon in the presence of a catalyst such as a tertiary amine.

It is believed that the weatherability and certain other beneficial properties of the polymers comprising resorcinol arylate polyester chain members of the invention are attributable, at least in part, to the occurrence of thermally or photochemically induced Fries rearrangement of arylate blocks to yield o-hydroxybenzophenone moieties or analogs thereof which serve as stabilizers to UV radiation. More particularly, at least a portion of resorcinol arylate polyester chain members can rearrange to yield chain members with at least one hydroxy group ortho to at least one ketone group. Such rearranged chain members are typically o-hydroxybenzophenone-type chain members comprising one or more of the following structural moieties:

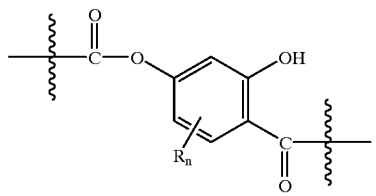

Formula XIV

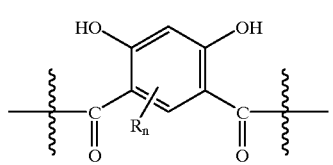

Formula XV

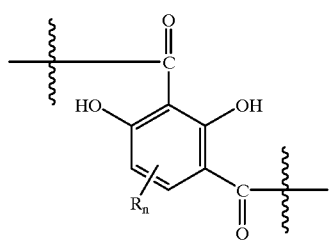

Formula XVI wherein R and n are as previously defined. The o-hydroxy-benzophenone-type chain members resulting from rearrangement of resorcinol arylate chain members can be present in resorcinol arylate polyesters and in resorcinol arylate polyester-containing copolymers, including resorcinol arylate-containing copolyestercarbonates and resorcinol arylate-containing copolyesters containing soft-blocks. It is also contemplated to introduce moieties of the types illustrated in Formulas XIV, XV, and XVI via synthesis and polymerization of appropriate monomers in both homopolymers and copolymers by the method of the present invention. In one embodiment the present invention provides thermally stable polyesters, copolyestercarbonates, and copolyesters comprising structural units represented by Formulas III and XIV, wherein the molar ratio of structural units represented by Formula III to structural units represented by Formula XIV ranges from about 99:1 to about 1:1, and preferably from about 99:1 to about 80:20.

The polymers and copolymers comprising thermally stable resorcinol arylate polyester chain members may also be employed as weatherability-improving additives in blends with at least one other polymer, especially polycarbonates (hereinafter sometimes designated "PC"), polyesters, polyetherimides, polyphenylene ethers, and addition polymers. Related blends are disclosed in commonly owned U.S. Pat. No. 6,143,839.

The polycarbonates in the blend compositions of the invention are, for the most part, similar in molecular structure to the carbonate blocks of the block copolyestercarbonate as described hereinabove, with bisphenol-A homo- and copolycarbonates generally being preferred. Polyesters are illustrated by poly(alkylene dicarboxylates), especially poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly(butylene naphthalate) (hereinafter sometimes designated "PBN"), poly(cyclohexanedimethanol terephthalate), poly(cyclohexanedimethanol-co-ethylene terephthalate) (hereinafter sometimes designated "PETG"), and poly(1,4-cyclohexanedimethyl-1,4-cyclohexanedicarboxylate) (hereinafter sometimes designated "PCCD"), and especially poly(alkylene arenedioates), with poly(ethylene terephthalate) and poly(1,4-butylene terephthalate) being preferred.

Copolyestercarbonates may also be used in blends with polymers comprising resorcinol arylate polyester chain members. Such copolymers comprise, in addition to the organic carbonate units, ester units such as isophthalate and/or terephthalate. The copolyestercarbonates which find use in the instant invention and the methods for their preparation are well known in the art as disclosed in, for example, U.S. Pat. Nos. 3,030,331; 3,169,121; 3,207,814; 4,194,038; 4,156,069; 4,238,596; 4,238,597; 4,487,896; and 4,506,065.

Suitable addition polymers include homopolymers and copolymers, especially homopolymers of alkenylaromatic compounds, such as polystyrene, including syndiotactic polystyrene, and copolymers of alkenylaromatic compounds with ethylenically unsaturated nitrites, such as acrylonitrile and methacrylonitrile; dienes, such as butadiene and isoprene; and/or acrylic monomers, such as ethyl acrylate. These latter copolymers include the ABS (acrylonitrile-butadiene-styrene) and ASA (acrylonitrile-styrene-alkyl acrylate) copolymers.

In another embodiment the invention encompasses blends of polymers and/or copolymers comprising thermally stable resorcinol arylate polyester chain members with at least two other polymers. Said at least two other polymers may comprise miscible, immiscible, and compatibilized blends including, but not limited to, PC/ABS, PC/ASA, PC/PBT, PC/PET, PC/polyetherimide, polyester/polyetherimide, polyphenylene ether/polystyrene, polyphenylene ether/polyamide, and polyphenylene ether/polyester.

The blend compositions of the invention may be prepared by such conventional operations as solvent blending and melt blending. A particularly preferred method for blend preparation is melt blending such as by extrusion. The blends may additionally contain art-recognized additives including pigments, dyes, impact modifiers, UV screeners, flame retardants, fillers, stabilizers, flow aids, ester interchange inhibitors, and mold release agents. It is intended that the blend compositions include simple physical blends and any reaction products thereof, as illustrated, for example, by polyester-polycarbonate transesterification products.

Proportions of the polymers comprising resorcinol arylate polyester chain members in such blends are determined chiefly by the resulting proportions of arylate blocks, which most often comprise the active weatherability-improving entities, typical proportions providing about 10–50% by weight of arylate blocks in the blend. In blends where some degree of incompatibility may exist between the polymers comprising resorcinol arylate polyester chain members of the invention and the polycarbonates, polyesters, or addition polymers with which they may be combined, said blends are sometimes not fully transparent. However, transparent blends may often be prepared, if desired, by adjusting the length of the arylate blocks in the polymers comprising resorcinol arylate polyester chain members. The other properties of said blends are generally excellent.

Compositions comprising resorcinol arylate polyester chain members made by various embodiments of the method of the invention typically have significantly lower color, both before and after thermal processing, than related compositions made by melt methods, interfacial methods, and solution methods of the prior art. In particular, melt methods typically provide resorcinol arylate polyester with tan to dark brown color while the present interfacial method provides very lightly colored or essentially colorless polyester. The present compositions may be used in various applications, especially those involving outdoor use and storage, and hence requiring resistance to weathering. Their light transmitting properties are often similar to those of polycarbonates. Thus, they are often substantially transparent and colorless, and may often be employed as substitutes for polycarbonates in the fabrication of transparent sheet material when improved weatherability is mandated.

In another embodiment the present invention comprises multilayer articles comprising a substrate layer comprising at least one thermoplastic polymer, thermoset polymer, cellulosic material, glass, ceramic, or metal, and at least one coating layer thereon, said coating layer comprising at least one polymer comprising structural units derived from at least one 1,3-dihydroxybenzene moiety and at least one aromatic dicarboxylic acid moiety and prepared by methods embodied in the present invention. In the present context a multilayer article is one containing at least two layers. In various embodiments a coating layer comprises at least one thermally stable polymer comprising resorcinol arylate polyester chain members substantially free of anhydride linkages linking at least two mers of the polymer chain. Optionally, the multilayer articles may further comprise an interlayer, for example an adhesive interlayer, between any substrate layer and any thermally stable polymer coating layer. Multilayer articles of the invention include, but are not limited to, those which comprise a substrate layer and a coating layer of said thermally stable polymer; those which comprise a substrate layer with a coating layer of said thermally stable polymer on each side of said substrate layer; and those which comprise a substrate layer and at least one coating layer of said thermally stable polymer with at least one interlayer between a substrate layer and a coating layer. Any interlayer may be transparent, translucent, or opaque, and/or may contain an additive, for example a colorant or decorative material such as metal flake. If desired, an overlayer may be included over the coating layer of thermally stable polymer, for example to provide abrasion or scratch resistance. The substrate layer, coating layer of thermally stable polymer, and any interlayers or overcoating layers are preferably in contiguous superposed contact with one another.

Within the context of the present invention it should be understood that any coating layer comprising a thermally stable polymer comprising resorcinol arylate polyester chain members will also include polymer comprising o-hydroxy-benzophenone or analogous chain members resulting from Fries rearrangement of said resorcinol arylate chain members, for example after exposure of said coating layer to UV-light. Typically, a preponderance of polymer comprising o-hydroxy-benzophenone or analogous chain members will be on that side or sides of said coating layer exposed to UV-light and will overlay in a contiguous superposed layer or layers that polymer comprising unrearranged resorcinol arylate chain members. If it is worn away or otherwise removed, polymer comprising o-hydroxybenzophenone or analogous chain members is capable of regenerating or renewing itself from the resorcinol arylate-containing layer or layers, thus providing continuous protection for any UV-light sensitive layers.

In various embodiments coating layers may also comprise art recognized additives including, but not limited to, including colorants, pigments, dyes, color stabilizing additives, auxiliary UV screeners, fillers, stabilizers, ester interchange inhibitors, and mold release agents.

In some embodiments coating layers may comprise auxiliary UV screeners. Illustrative UV screeners include, but are not limited to, hydroxybenzophenones, hydroxybenzotriazoles, hydroxybenzotriazines, cyanoacrylates, oxanilides, benzoxazinones and those disclosed in standard reference works such as "Plastics Additives Handbook", 5th edition, edited by R. Gächter and H M üller, Hanser Publishers. Illustrative UV screeners also include nano-size inorganic materials such as titanium oxide, cerium oxide, and zinc oxide, all with particle size less than about 100 nanometers.

When present, the amount of auxiliary UV screener employed is in one embodiment in a range between about 0.05 wt. % and 10 wt. %, in another embodiment in a range between about 0.1 wt. % and about 6 wt. %, in another embodiment in a range between about 0.5 wt. % and about 5 wt. %, and in still another embodiment in a range between about 1 wt. % and about 5 wt. % based on the weight of resorcinol arylate polymer in a coating layer. An auxiliary UV screener may be combined with coating layer using known methods. In one embodiment auxiliary UV screener is at least partially dissolved in a solution with components of a coating layer, and a film of coating layer comprising auxiliary UV screener is solvent cast. In another embodiment auxiliary UV screener is at least partially dissolved in a solution and impregnated from said solution into solid or at least partially solid coating layer. In still another embodiment auxiliary UV screener is combined with coating layer in a melt method such as co-extrusion.

The material of the substrate layer in the articles of this invention may be at least one thermoplastic polymer, whether addition or condensation prepared. Condensation polymers include, but are not limited to, polycarbonates, particularly aromatic polycarbonates, polyphenylene ethers, polyetherimides, polyamides and polyesters and polyester-carbonates (other than those employed for the coating layer, as defined hereinafter). Polycarbonates and polyesters are frequently preferred. A substrate layer may additionally contain art-recognized additives including colorants, pigments, dyes, impact modifiers, color stabilizing additives, UV screeners, flame retardants, fillers, stabilizers, flow aids, ester interchange inhibitors, and mold release agents.

Suitable polycarbonates include homopolycarbonates comprising structural units of the type described for the organic carbonate blocks in the copolyestercarbonates of the invention. The most preferred polycarbonates are bisphenol A homo- and copolycarbonates. Preferably, the weight average molecular weight of the initial polycarbonate ranges from about 5,000 to about 100,000; more preferably, from about 25,000 to about 65,000.

The polycarbonate substrate may also be a copolyester-carbonate (other than that copolyestercarbonate employed for the coating layer as defined hereinafter). Such copolymers typically comprise, in addition to the organic carbonate units, ester units such as isophthalate and/or terephthalate. The copolyestercarbonates which find use in the instant invention and the methods for their preparation are well known in the art as disclosed in, for example, U.S. Pat. No. Nos. 3,030,331; 3,169,121; 3,207,814; 4,194,038; 4,156,069; 4,238,596; 4,238,597; 4,487,896; and 4,506,065.

Polyester substrates include, but are not limited to, poly(ethylene terephthalate), poly(1,4-butylene terephthalate), poly(trimethylene terephthalate), poly(ethylene naphthalate), poly(butylene naphthalate), poly(cyclohexanedimethanol terephthalate), poly(cyclohexanedimethanol-co-ethylene terephthalate), and poly(1,4-cyclohexanedimethyl-1,4-cyclohexanedicarboxylate).

Suitable addition polymer substrates include homo- and copolymeric aliphatic olefin and functionalized olefin polymers (which are homopolymers and copolymers comprising structural units derived from aliphatic olefins or functionalized olefins or both), and their alloys or blends. Illustrative examples include polyethylene, polypropylene, thermoplastic polyolefin ("TPO"), poly(vinyl chloride), poly(vinyl chloride-co-vinylidene chloride), poly(vinyl fluoride), poly(vinylidene fluoride), poly(vinyl acetate), poly(vinyl alcohol), poly(vinyl butyral), poly(acrylonitrile), acrylic polymers such as those of (meth)acrylamides or of alkyl (meth)acrylates such as poly(methyl methacrylate) ("PMMA"), and polymers of alkenylaromatic compounds such as polystyrenes, including syndiotactic polystyrene. The preferred addition polymers for many purposes are polystyrenes and especially the so-called ABS and ASA copolymers, which may contain thermoplastic, non-elastomeric styrene-acrylonitrile side chains grafted on an elastomeric base polymer of butadiene and alkyl acrylate, respectively.

Blends of any of the foregoing polymers may also be employed as substrates. Typical blends include, but are not limited to, those comprising PC/ABS, PC/ASA, PC/PBT, PC/PET, PC/polyetherimide, PC/polysulfone, polyester/polyetherimide, PMMA/acrylic rubber, polyphenylene ether-polystyrene, polyphenylene ether-polyamide or polyphenylene ether-polyester. Although the substrate layer may incorporate other thermoplastic polymers, the above-described polycarbonates and/or addition polymers still more preferably constitute the major proportion thereof.

The substrate layer in the multilayer articles of this invention may also comprise at least one of any thermoset polymer. Suitable thermoset polymer substrates include, but are not limited to, those derived from epoxys, cyanate esters, unsaturated polyesters, diallylphthalate, acrylics, alkyds, phenol-formaldehyde, novolacs, resoles, bismaleimides, PMR resins, melamine-formaldehyde, urea-formaldehyde, benzocyclobutanes, hydroxymethylfurans, and isocyanates. In one embodiment of the invention the thermoset polymer substrate further comprises at least one thermoplastic polymer, such as, but not limited to, polyphenylene ether, polyphenylene sulfide, polysulfone, polyetherimide, or polyester. Said thermoplastic polymer is typically combined with thermoset monomer mixture before curing of said thermoset.

In one embodiment of the invention a thermoplastic or thermoset substrate layer also incorporates at least one filler and/or pigment. Illustrative extending and reinforcing fillers, and pigments include silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers, carbon fibers, and metal fibers, as well as colorants such as metal flakes, glass flakes and beads, ceramic particles, other polymer particles, dyes and pigments which may be organic, inorganic or organometallic. In another embodiment the invention encompasses multilayer articles comprising a filled thermoset substrate layer such as a sheet-molding compound (SMC).

The substrate layer may also comprise at least one cellulosic material including, but not limited to, wood, paper, cardboard, fiber board, particle board, plywood, construction paper, Kraft paper, cellulose nitrate, cellulose acetate butyrate, and like cellulosic-containing materials. The invention also encompasses blends of at least one cellulosic material and either at least one thermoset polymer (particularly an adhesive thermoset polymer), or at least one thermoplastic polymer (particularly a recycled thermoplastic polymer, such as PET or polycarbonate), or a mixture of at least one thermoset polymer and at least one thermoplastic polymer.

Multilayer articles encompassed by the invention also include those comprising at least one glass layer. Typically any glass layer is a substrate layer, although multilayer articles comprising a thermally stable polymer coating layer interposed between a glass layer and a substrate layer are also contemplated. Depending upon the nature of coating and glass layers, at least one adhesive interlayer may be beneficially employed between any glass layer and any thermally stable polymer coating layer. The adhesive interlayer may be transparent, opaque or translucent. For many applications it is preferred that the interlayer be optically transparent in nature and generally have a transmission of greater than about 60% and a haze value less than about 3% with no objectionable color.

Metal articles exposed to UV-light may exhibit tarnishing and other detrimental phenomena. In another embodiment the invention encompasses multilayer articles comprising at least one metal layer as substrate layer. Representative metal substrates include those comprising brass, aluminum, magnesium, chrome, iron, steel, copper, and other metals or alloys or articles containing them, which may require protection from UV-light or other weather phenomena. Depending upon the nature of coating and metal layers, at least one adhesive interlayer may be beneficially employed between any metal layer and any thermally stable polymer coating layer.

Also present in the articles of the invention is at least one coating layer comprising at least one polymer comprising structural units derived from at least one 1,3-dihydroxybenzene moiety and at least one aromatic dicarboxylic acid moiety prepared by methods embodied in the present invention. In various embodiments, suitable coating layers comprise polymers comprising thermally stable resorcinol arylate polyester chain members. In other embodiments suitable coating layers comprise resorcinol arylate polyesters, copolyesters (particularly those containing softblocks), copolyestercarbonates, and mixtures thereof. Copolyestercarbonates, when used in both substrate layer and in coating layer, are different from each other in molecular structure. More specifically, when the coating layer contains copolyestercarbonate with resorcinol arylate polyester blocks, then any ester blocks in the substrate copolyestercarbonate layer will typically be derived from the same divalent organic radical as contained in the carbonate blocks.

It is also within the scope of the invention for other polymers to be present which are miscible in at least some proportions with a polymer coating layer comprising at least one thermally stable polymer comprising structural units derived from at least one 1,3-dihydroxybenzene moiety and at least one aromatic dicarboxylic acid moiety. Illustrative examples of at least partially miscible polymers include polyetherimide and polyesters such as PBT, PET, PTT, PEN, PBN, PETG, PCCD, and bisphenol A polyarylate. Preferably, the coating layer polymer consists essentially of thermally stable resorcinol arylate polyesters, copolyesters, or copolyestercarbonates.

Another aspect of the invention is a method for preparing a multilayer article which comprises applying at least one thermally stable coating layer to a second layer, said second layer comprising at least one thermoplastic polymer, thermoset polymer, cellulosic material, glass, or metal, and said coating layer comprising at least one polymer comprising structural units derived from at least one 1,3-dihydroxybenzene moiety and at least one aromatic dicarboxylic acid moiety, the polymer being substantially free of anhydride linkages linking at least two mers of the polymer chain.

In one embodiment of the invention, at least one thermally stable coating layer is applied to a second layer, which may be the substrate layer or at least one intermediate layer ultimately to be disposed between the coating and substrate layers. An intermediate layer may generally comprise any of the materials suitable for use as the substrate or coating layer, and may further contain fillers and colorants such as described hereinabove. When necessary, it may be specifically chosen so as to provide good adhesion between substrate and coating layers. Colorants of the previously described types may also be present in the coating layer.

Application of the at least one coating layer may be performed by solvent-casting. More preferably, application of said coating layer comprises fabrication of a separate sheet thereof followed by application to the second layer, or by simultaneous production of both layers, typically in a melt process. Thus, there may be employed such methods as co-injection molding, coextrusion, overmolding, blow molding, multi-shot injection molding and placement of a film of the coating layer material on the surface of the second layer followed by adhesion of the two layers, typically in an injection molding apparatus; e.g., in-mold decoration, or in a hot-press. These operations may be conducted under art-recognized conditions.

It is also within the scope of the invention to apply a structure comprising the coating layer and the second layer to a third, substrate layer, which is generally of a thermoplastic, thermoset, or cellulosic material similar or identical to that of the second layer but different from that of the coating layer. This may be achieved, for example, by charging an injection mold with the structure comprising the coating layer and the second layer and injecting the substrate sheet material behind it. By this method, in-mold decoration and the like are possible. Both sides of the substrate layer may receive the other layers, though it is usually preferred to apply them to only one side.

The thicknesses of the various layers in multilayer articles of this invention are most often as follows:

substrate—at least about 125μ (microns), preferably at least about 250 μ, more preferably at least about 400μ, coating—about 2–2,500, preferably about 10–250 and most preferably about 50–175μ, second material, if any—about 2–2,500, preferably about 10–250, and most preferably about 50–175μ, total—at least about 125μ, preferably at least about 250μ, more preferably at least about 400μ.

The articles of this invention are typically characterized by the usual beneficial properties of the substrate layer, in addition to weatherability. In various embodiments may be evidenced by such properties as improved initial gloss, improved initial color, improved resistance to ultraviolet radiation and maintenance of gloss, improved impact strength, and resistance to organic solvents encountered in their final applications. Depending upon such factors as the coating layer/substrate combination, the multilayer articles may possess recycling capability, which makes it possible to employ the regrind material as a substrate for further production of articles of the invention.

Multilayer articles which can be made which comprise thermally stable polymers comprising resorcinol arylate polyester chain members include aircraft, automotive, truck, military vehicle (including automotive, aircraft, and waterborne vehicles), scooter, and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

The invention is illustrated by the following, non-limiting examples. All parts are by weight unless otherwise designated. Molecular weight values for polymeric samples were determined by gel permeation chromatography (GPC) using 3% isopropanol/chloroform eluent at 0.75 milliliters (ml) per minute (min) on a Polymer Labs Mixed C size exclusion column held at 35° C., and calibrated using polystyrene standards, and analyzed with Turbogel software.

EXAMPLE 1

This example illustrates the preparation of a thermally stable resorcinol arylate polyester with both iso- and terephthalate units. To a one liter, five neck, Morton flask blanketed with nitrogen and equipped with a mechanical stirrer, pH electrode, reflux condenser, two pressure equalizing addition funnels, was charged resorcinol (21.8 grams [g]; 0.198 moles [mol]), resorcinol monobenzoate capping agent (1.07 g; 2.5 mole %), triethylamine (0.274 ml; 1 mole %), dichloromethane (150 ml), and water (100 ml). One addition funnel was charged with sodium hydroxide pellets (16.84 g; 0.42 mol) and water (32 ml), while a solution of isophthaloyl dichloride (20.3 g; 0.1 mol), terephthaloyl dichloride (20.3 g; 0.1 mol), and dichloromethane (150 ml) was added to the second. The pH of the reaction mixture was adjusted to 7.5 with sodium hydroxide prior to the addition of acid chloride solutions, which were added over 6 minutes. The pH of the reaction was maintained between 7.25 and 7.75 for the first ten minutes of reaction. At 11 minutes the reaction the pH was raised to about 10 with the addition of sodium hydroxide and held for an additional 10 minutes. The stirring was stopped and the aqueous layer was removed. The resulting gray organic layer was washed with 1N hydrochloric acid, 0.1N hydrochloric acid, water (three times), and the polymer isolated by precipitation into boiling water yielding a white, fibrous material which was dried in vacuum at 110° C. overnight. The isolated polymer was the desired resorcinol arylate polyester.

Control Example 1

A polyester of resorcinol with a mixture of iso- and terephthalate was prepared in a blender according to the interfacial method of U.S. Pat. No. 3,460,961. The isolated polymer had weight average molecular weight of about 289,000. The procedure was modified by addition of 4 mole % chain-stopper (phenol), resulting in polymer with weight average molecular weight of about 51,000.

Control Example 2

A polyester of resorcinol with a mixture of iso- and terephthalate was prepared according to the solution method of Cohen et al., Journal of Polymer Science: Part A-1, vol. 9, 3263–3299 (1971). To a one-liter, three neck, round bottomed flask equipped with a mechanical stirrer and an addition funnel were charged isophthaloyl dichloride (5.076 g, 25 millimoles [mmol]), terephthaloyl dichloride (5.076 g, 25 mmol), resorcinol (5.506 g, 50 mmol), and tetrahydrofuran (200 ml) dried by distillation from sodium and benzophenone. Polymerization was initiated by dropwise addition of a stoichiometric amount of triethylamine (10.12 g, 10 mmol) over 30 minutes. The mixture then was stirred for 3 hours at room temperature. Triethylamine hydrochloride was removed from the reaction mixture by filtration. The filtrate was slowly poured into methanol (500 ml) in a blender. The precipitated polymer was washed with hot water and dried in a vacuum oven. The isolated polymer had weight average molecular weight of about 47,000.

EXAMPLES 2–11

These examples illustrate the preparation of hydroxy-terminated resorcinol iso/terephalate oligomers. Into a 1 liter Morton flask equipped with a mechanical stirrer, pH electrode, condenser, and two addition tubes connected to metering pumps were charged resorcinol (12.11 g, 0.11 mol), water (18 ml), methylene chloride (200 ml), and triethylamine (140 to 560 microliters, 1 to 4 mol % based on acid chlorides). The mixture was stirred at 500 rpm. A two-step addition profile was used for the delivery of acid chloride solution and base solution. In the first step, a majority of base (60 to 80% out of total base amount of 17.5 ml of 33% aqueous sodium hydroxide solution) and the whole acid chloride solution (70 ml solution of isophthaloyl dichloride (10.15 g, 0.05 mol) and terephthaloyl dichloride (10.15 g, 0.05 mol) in methylene chloride) were added at constant rates, and the remaining base was added in the second step at continuously decreasing rate. The base was pumped from graduated burets and the amount was checked every 30 seconds in order to control the stoichiometry. The pH varied between about 3.5 and about 8. The length of the first step was varied from 7 to 13 minutes with the total step 1 and step 2 time constant at 25 minutes. The reaction mixture was further stirred for 30 minute total reaction time. The reaction conditions and weight average molecular weights of the isolated polymers are shown in Table 1.

TABLE 1

| Example | % Base Added in 1st Step | Base Addition time (min.) | mol % triethylamine | Oligomer Mw[a] |
|---|---|---|---|---|
| 2 | 60 | 7 | 1 | 27.3 |
| 3 | 60 | 7 | 4 | 26.9 |
| 4 | 60 | 13 | 4 | 24.5 |
| 5 | 60 | 13 | 1 | 26 |
| 6 | 70 | 10 | 2.5 | 28.3 |
| 7 | 70 | 10 | 2.5 | 23 |
| 8 | 80 | 7 | 4 | 28.4 |
| 9 | 80 | 7 | 1 | 30.8 |
| 10 | 80 | 13 | 4 | 29.5 |
| 11 | 80 | 13 | 1 | 30.4 |

[a]times $10^{-3}$

A sample of each polymer was analyzed for anhydride content by treatment in solution with diisobutylamine. Polymers prepared using 4 mol % triethylamine showed greater than 95% retention of weight average molecular weight.

EXAMPLES 12–28

The procedure of Examples 2–11 was repeated except that in some experiments 13 to 15 mol % total excess of resorcinol was used. In some experiments a small amount of capping agent (1 mol % phenol) was added. In some cases, the reaction mixture was heated externally to a refluxing point at 3 minutes. The reaction conditions and weight average molecular weights of the isolated polymers are shown in Table 2.

TABLE 2

| Example | mol % triethylamine | Comments[a] | Reflux[b] | Initial Mw[c] | % Mw Retention[d] |
|---|---|---|---|---|---|
| 12 | 4 | 1% PhOH | Y | 19.5 | 99 |
| 13 | 4 | 15% excess Rs | N | 19.9 | 100 |
| 14 | 4 | 0.5% PhOH | N | 21.6 | 99.5 |
| 15 | 4 | 15% excess Rs | Y | 21.8 | 96.6 |
| 16 | 4 | 1% PhOH | N | 21.9 | 99.3 |
| 17 | 4 | 1% PhOH | Y | 22.2 | 97.7 |
| 18 | 4 |  | N | 22.3 | 96.1 |
| 19 | 4 | 13% excess Rs | N | 22.4 | 97.7 |
| 20 | 4 | 1% PhOH | Y | 22.4 | 96.4 |
| 21 | 4 | 1% PhOH | Y | 22.5 | 93 |
| 22 | 4 | 1% PhOH | N | 22.7 | 97.8 |
| 23 | 4 | 0.5 PhCOCl | N | 24.6 | 99 |
| 24 | 2.5 | 1% PhOH | Y | 24.7 | 97.2 |
| 25 | 4 |  | N | 24.8 | 96.7 |
| 26 | 4 |  | Y | 25.3 | 98 |
| 27 | 4 |  | N | 26.6 | 97.7 |
| 28 | 3 |  | Y | 30.3 | 100 |

[a]PhOH (phenol); Rs (resorcinol); PhCOCl (benzoyl chloride)
[b]Y (Yes); N (No)
[c]times $10^{-3}$
[d]following treatment with diisobutylamine in solution

EXAMPLES 29–46

The procedure of Examples 2–11 was repeated except that a portion of tertiary amine was added following addition of dicarboxylic acid dichloride to resorcinol moiety. A total of 4 mol % tertiary amine (40000 ppm; based on moles acid chlorides) was added. The reaction conditions and weight average molecular weights of the isolated polymers are shown in Table 3. Example 46 is a control experiment in which all the tertiary amine was present at the beginning of the reaction before addition of dicarboxylic acid dichloride to resorcinol moiety

TABLE 3

| Example | % Base Added in 1st Step | Base Addition time (min.) | TEA added initially (ppm) | Initial Mw[a] | % Mw Retention[b] |
|---|---|---|---|---|---|
| 29 | 80 | 7 | 50 | 29.3 | 96.5 |
| 30 | 80 | 7 | 10 | 23.1 | 86.8 |
| 31 | 80 | 7 | 10 | 22.2 | 98.5 |
| 32 | 80 | 7 | 50 | 29.4 | 97.4 |
| 33 | 96 | 7 | 10 | 32.7 | 94.3 |
| 34 | 96 | 7 | 50 | 34.4 | 92.5 |
| 35 | 88 | 10 | 30 | 26.5 | 99.4 |
| 36 | 88 | 10 | 30 | 25.6 | 101 |
| 37 | 80 | 13 | 50 | 25.9 | 95.9 |
| 38 | 80 | 13 | 10 | 25.2 | 96.6 |
| 39 | 96 | 13 | 50 | 29.4 | 90.2 |

TABLE 3-continued

| Example | % Base Added in 1st Step | Base Addition time (min.) | TEA added initially (ppm) | Initial Mw[a] | % Mw Retention[b] |
|---|---|---|---|---|---|
| 40 | 96 | 13 | 10 | 22.14 | 98.59 |
| 41 | 96 | 13 | 50 | 26.7 | 92.93 |
| 42 | 96 | 13 | 10 | 23.6 | 90.5 |
| 43 | 96 | 16 | 10 | 21.6, 22.0 | 98.8, 98.0 |
| 44 | 96 | 19 | 10 | 24.1, 22.3 | 95.9, 97.3 |
| 45 | 64 | 7 | 10 | 21.46, 23.31 | 96.3, 100 |
| 46 | 96 | 16 | 40000 | 24.7, 23.1 | 92.7, 94.4 |

[a]times $10^{-3}$
[b]following treatment with diisobutylamine in solution

EXAMPLE 47

This example illustrates the preparation of a thermally stable resorcinol iso/terephthalate-block-copolycarbonate beginning with the preparation of hydroxy-terminated resorcinol iso/terephthalate oligomer. To a thirty liter glass reactor equipped with a glass impeller, centrifuge recirculation pump, reflux condenser and pressure-equilibration addition funnel were charged resorcinol (605.6 g, 5.5 mol), methyltributylammonium chloride (82.5 g of a 75% wt. aqueous solution; 0.275 mol), dichloromethane (6.5 liters), and water (2.5 liters). The recirculation pump was turned on and the mixture was degassed with nitrogen while stirring. The pH of the aqueous phase was adjusted to 7 with 50% aqueous sodium hydroxide solution. Reaction was carried out by adding a solution of acid chlorides (507.5 g each of iso- and terephthaloyl dichlorides; 5.00 moles total in 2.0 liters of dichloromethane solution) while stirring and simultaneously adding 50% sodium hydroxide solution at such a rate that the pH was maintained between 6 and 8. The acid chlorides were added using a three-step program with the rate of addition declining with each step. A timer was started at the beginning of acid chloride addition. The pH was maintained at 8 while adding acid chlorides over 8 minutes using the following protocol: 40% of total acid chlorides was added over the first 2 minutes; 30% of total was added over the next 2 minutes; the remaining 30% of total was added over the next 4 minutes. The recirculation loop was running during the entire time.

Following complete addition of acid chlorides, the pH was slowly raised to 11–12 over two to three minutes, and the reaction mixture was stirred for 10 minutes. The polymer formed was a hydroxy-terminated oligomer with weight average molecular weight (Mw) of approximately 20,000.

Bisphenol A (1102 g, 4.83 mol), dichloromethane (4.0 liters), triethylamine (17 ml, 0.12 mol), p-cumyl phenol capping agent (60 g), and water (6.0 liters) were then added and the recirculation loop was turned on. Phosgene was introduced at pH 7.5–8.5, then increasing slowly to pH 10–10.5 using a 15% excess over the theoretical amount of phosgene.

The reaction mixture was separated, the organic phase washed with 1N hydrochloric acid, 0.1N hydrochloric acid, and twice with water, and the polymer was The reaction mixture was separated, the organic phase washed with 1N hydrochloric acid, 0.1N hydrochloric acid, and twice with water, and the polymer was isolated by precipitation in methanol. The polymer obtained was the desired resorcinol iso/terephthalate-co-BPA polycarbonate copolymer.

EXAMPLES 48–61

Samples of polymers comprising resorcinol arylate polyester chain members were dried in vacuo at 120° C. for 15 hrs. A weighed sample of about 25–30 milligrams was placed in a circular die cavity 2 centimeters (cm.) in diameter and covered with a cylindrical piston of the same size. The die assembly containing the sample was heated in a Carver press at 290° C. for 5 minutes at 500–4,000 pounds gauge (lbs.g.) pressure, then removed and cooled in chill blocks. The heat treatment produced a film about 1 mil in thickness and 2 cm. in diameter. Molecular weights of samples before and after the heat treatment were measured by GPC using polystyrene standards. Table 4 shows examples of melt stability for resorcinol arylate polyesters prepared using the method of Example 1 and Control Examples 1 and 2, and for resorcinol arylate-containing copolyestercarbonates prepared using the method of Example 47. Wt. % resorcinol arylate in the Table refers to wt. % resorcinol arylate chain members in the polymer, the remaining mers being organic carbonate mers.

TABLE 4

| Example | wt. % resorcinol arylate | % Mw Retention, melt test | % Mw Retention, amine test[f] |
|---|---|---|---|
| 48[a] | 50 | 89.4 | 98 |
| 49[a] | 80 | 84 | 97.9 |
| 50[a] | 50 | 84.8 | 94 |
| 51[b] | 50 | 98.8 | 99.5 |
| 52[b] | 35 | 98.7 | 99.3 |
| 53[a] | 100 | 55 | 62 |
| 54[a] | 100 | 55.9 | 61 |
| 55[a] | 100 | 45 | 40 |
| 56[b] | 100 | 87.5 | 86 |
| 57[b] | 100 | 97.7 | 99.6 |
| 58[b] | 100 | 99.5 | 99 |
| 59[c] | 100 | 12 | 25 |
| 60[d] | 100 | 46 | 74 |
| 61[e] | 100 | 77 | 78 |

[a]final reaction mixture stirred 5 min at pH 10
[b]final reaction mixture stirred 20 min at pH 10–12
[c]Control Example 1
[d]Control Example 1 using 4 mole % phenol chain-stopper
[e]Control Example 2
[f]following treatment with diisobutylamine in solution

EXAMPLE 62

A resorcinol arylate polyester was prepared by the interfacial method of Control Example 1 except that the organic solvent was dichloromethane and a capping agent was present. Extrusion of the material gave orange pellets. The polymer had initial weight average molecular weight (Mw) of 61,300 and Mw after extrusion of 52,200 (85% retention). A separate sample of material was treated with dibutylamine in solution; the Mw of the recovered material was 42,400 (69% retention).

EXAMPLE 63

A resorcinol arylate polyester was prepared by the method of Example 1. Extrusion of the material gave yellowish pellets. The polymer had initial Mw of 53,600 and Mw after extrusion of 50,800 (95% retention). A separate sample of material was treated with dibutylamine in solution; the Mw of the recovered material was 48,400 (90% retention).

EXAMPLE 64

A resorcinol arylate-containing block copolyestercarbonate with 50% by weight carbonate blocks and 1:1 ratio of isophthalate to terephthalate in the resorcinol arylate blocks was prepared by the method of Example 47 except that the resorcinol arylate-containing polyester block was made using the procedure of Control Example 1 using a capping agent and dichloromethane as the organic solvent. Extrusion of the material gave amber pellets. The copolymer had initial Mw of 75,900 and Mw after extrusion of 64,500 (85% retention). A separate sample of material was treated with dibutylamine in solution; the Mw of the recovered material was 73,000 (96% retention).

EXAMPLE 65

A resorcinol arylate-containing block copolyestercarbonate was prepared by the method of Example 47 with 50% by weight carbonate blocks and 1:1 ratio of isophthalate to terephthalate in the resorcinol arylate blocks. Extrusion of the material gave faintly yellowish pellets. The copolymer had initial Mw of 52,300 and Mw after extrusion of 51,700 (99% retention). A separate sample of material was treated with dibutylamine in solution; the Mw of the recovered material was 51,500 (98% retention).

Disks were formed from the resorcinol arylate-containing polymers of Examples 62–65. The disks were approximately 0.6 millimeters (mm) (0.024 inches) thick and 50 mm (2.0 inches) diameter, and were formed from melt-processed polymer (either pellets, extruded film, or injection molded parts) under the following conditions: 2.1 g of melt-processed polymer were placed in a mold between heated platens of a hydraulic press and heated at about 200° C. with no applied pressure for 3 minutes, then under 4500 lbs.g. pressure for 1 minute, and finally under 6500 lbs.g. pressure for 1 minute. The mold was then rapidly cooled in ice water and opened to remove the disk.

The disks prepared as described were laminated onto injection-molded plaques of LEXAN 140 polycarbonate (from General Electric Plastics) containing 2 wt. % of titanium dioxide pigment under the following conditions to make well-adhered multilayer articles. All materials were placed in a heated (60° C.) vacuum desiccator overnight. A disk was placed onto an injection molded plaque of polycarbonate 2.5 inches square and one-eighth inch thick in a mold between heated platens of a hydraulic press and heated at about 200° C. with no applied pressure for 2 minutes, then under 4500 lbs. gauge pressure for 1 minute, and finally under 6500 lbs. gauge pressure for 1 minute. All samples were well adhered.

The color of the disks and of the laminated plaques was determined on a GretagMacbeth™ Color-Eye 7000A colorimeter and reported as CIELAB values and yellowness index (YI; according to ASTM D1925). Results are shown on Table 5.

TABLE 5

| Example | Disks (transmission) | | | | Laminate on PC (reflection) | | | |
| --- | --- | --- | --- | --- | --- | --- | --- | --- |
|  | L* | a* | b* | YI | L* | a* | b* | YI |
| 62 | 90.45 | −1.23 | 15.2 | 26.01 | 76.6 | 3.57 | 31.74 | 61.07 |
| 63 | 94.73 | −0.3 | 3.61 | 6.34 | 86.18 | −0.38 | 14.95 | 27.4 |
| 64 | 93.82 | −0.43 | 5.4 | 9.5 | 84.21 | 0.88 | 20.44 | 38.27 |
| 65 | 95.52 | −0.11 | 1.31 | 2.26 | 91.21 | −0.8 | 6.95 | 12 |
| unlaminated PC |  |  |  |  | 94.86 | −0.52 | 2.88 | 4.51 |

The data show that the disks and multilayer articles formed from melt-processed resorcinol arylate-containing polymers made by a method of the invention have much less color and lower yellowness index than the respective control blends.

EXAMPLES 66–67

Resorcinol solutions were prepared by dissolving 1600 grams resorcinol and 200 ml. deoxygenated water containing 4 ml. gluconic acid solution (about 50 wt. % solution in water) in a vessel made of 316 stainless steel. The vessel was closed and a slight nitrogen purge through the solution was started (about 8 scfm). The vessel was held at 90° C. Samples were taken with time. A UV-VIS spectra was taken of the sample and the area under the curve from 400 nm to 600 nm was measured. The values at various times were divided by the value at time zero to calculate a relative color. A control experiment was performed under similar conditions using resorcinol solution in water without added acid. Comparative data are shown in Table 6.

TABLE 6

| Example 66 Control solution with no acid added | | Example 67 Solution with acid added | |
| --- | --- | --- | --- |
| Time | Relative Color | Time | Relative Color |
| 0 | 1.0 | 0 | 1.0 |
| 18 | 1.2 | 14 | 1.0 |
| 27 | 2.9 | 24 | 1.0 |
| 42 | 5.0 | 40 | 0.9 |
| 51 | 7.6 | 47 | 1.0 |
| 68 | 6.6 | 69 | 0.8 |
| 74 | 7.7 | 89 | 0.9 |
| 164 | 5.6 | 137 | 0.8 |

The data show that Example 66 without added acid developed higher level of color than Example 67 which contained added acid.

EXAMPLES 68–71

Solutions of resorcinol were prepared by dissolving 45 grams resorcinol in 55 grams of deoxygenated water. Acid was added to each resorcinol solution. Samples were removed with time and the absorbance at 470 nm was measured as an indication of color formation. A control experiment was run under similar conditions with no added acid. Comparative data are shown in Table 7. p-TSA is para-toluene sulfonic acid; IER is a sulfonic acid-functionalized ion exchange resin.

TABLE 7

| Example | Acid used | | Absorbance at 470 nm with time (hrs.) | | |
| --- | --- | --- | --- | --- | --- |
| # | type | amount | 24 | 48 | 120 |
| 68 | none | — | 0.0339 | 0.0599 | 0.0967 |
| 69 | conc. HCl | 50 µl | 0.0192 | 0.0138 | 0.0150 |
| 70 | p-TSA | 0.05 g | 0.0095 | 0.0170 | 0.0242 |
| 71 | IER | 0.2 g | 0.0245 | 0.0129 | 0.0118 |

The data show that Example 69 without added acid developed higher level of color than Examples 69–71 which contained added acid.

EXAMPLES 72–83

Solutions of resorcinol were prepared by dissolving 45 grams resorcinol in 55 grams of deoxygenated water. Acid was added to each resorcinol solution. Samples were removed with time and the absorbance at 470 nm was measured as an indication of color formation. A control experiment was run under similar conditions with no added acid. Comparative data are shown in Table 8. The abbreviation "glu. acid" is d-gluconic acid, while "S.S." is stainless steel.

TABLE 8

| Example # | container | Acid used type | amt. (ppm) | Absorbance at 470 nm with time (hrs.) 24 | 48 | 144 | 1008 | pH at 1008 hrs. |
|---|---|---|---|---|---|---|---|---|
| 72 | glass | none | — | 0.0253 | 0.0310 | 0.0073 | 0.453 | 3.65 |
| 73 | glass | HCl | 220 | 0.0159 | 0.0165 | 0.0049 | 0.0315 | 1.72 |
| 74 | glass | glu. acid | 290 | 0.0335 | 0.0179 | 0.0575 | 0.38 | 2.98 |
| 75 | glass | glu. acid | 290 | 0.0233 | 0.0134 | 0.0140 | 0.356 | 2.99 |
| 76 | glass | glu. acid | 1160 | 0.0253 | 0.0175 | 0.0106 | 0.301 | 2.81 |
| 77 | glass | glu. acid | 1160 | 0.0226 | 0.0197 | 0.0145 | 0.172 | 2.8 |
| 78 | glass | glu. acid | 2900 | 0.0160 | 0.0196 | 0.0199 | 0.141 | 2.71 |
| 79 | glass | glu. acid | 8700 | 0.0351 | 0.0328 | 0.0343 | 0.078 | 2.61 |
| 80 | 316 S.S. | none | — | 0.0152 | 0.0366 | 0.2016 | — | — |
| 81 | 316 S.S. | glu. acid | 290 | 0.0195 | 0.0135 | 0.0860 | — | — |
| 82 | 316 S.S. | glu. acid | 1160 | 0.0220 | 0.0138 | 0.0618 | — | — |
| 83 | 316 S.S. | glu. acid | 2890 | 0.0510 | 0.0146 | 0.0270 | — | — |

The data show that Examples 72 and 80 without added acid developed higher level of color than the other examples which contained added acid. The data also show that acid levels which provide a pH of below about 3 are effective for suppressing color development.

EXAMPLES 84–87

Solutions of resorcinol were prepared by dissolving 58.5 grams resorcinol in 71.5 grams of water. The water was sparged for 15 minutes with nitrogen before addition of resorcinol. Acid was added to each resorcinol solution. The samples were examined after 5 days for color formation. Sparging with nitrogen was continued over the 5 day test period. A control experiment was run under similar conditions with no added acid. Comparative data are shown in Table 9. The abbreviation "S.S." is stainless steel.

TABLE 9

| Example # | container | Acid used type | amount (ppm) | Color after 5 days |
|---|---|---|---|---|
| 84 | 316 S.S. | none | — | dark |
| 85 | 316 S.S. | HCl | 220 | colorless |
| 86 | 316 S.S. | acetic | 500 | colorless |
| 87 | 316 S.S. | phosphoric | 700 | colorless |

The data show that Example 84 without added acid developed higher level of color than Examples 85–87 which contained added acid.

EXAMPLES 88–100

Solutions of resorcinol were prepared by dissolving 40 grams resorcinol in 60 grams of water in glass containers. Deionized, deoxygenated water was used except for those samples comprising recycle water or comprising sulfuric acid. Acid was added to certain resorcinol solutions. Other samples comprised deoxygenated recycle water as noted. Recycle water was water recovered from washing a solution of bisphenol A polycarbonate comprising triethylamine in dichloromethane with an aqueous solution comprising hydrochloric acid. Recycle water comprised triethylamine hydrochloride and sodium chloride, and had a pH in a range of between about 1.0 and about 1.6. Samples were removed with time and the absorbance at 470 nm was measured as an indication of color formation. Control experiments (Examples 99 and 100) were run in deionized, deoxygenated water with no added acid. Comparative data are shown in Table 10.

TABLE 10

| | Example # | | | | | | | | | | | | |
|---|---|---|---|---|---|---|---|---|---|---|---|---|---|
| | 88 | 89 | 90 | 91 | 92 | 93 | 94 | 95 | 96 | 97 | 98 | 99 | 100 |
| Additive | glu. acid 0.250 µL | glu. acid 0.250 µL | glu. acid 0.750 µL | none; recycle water used | none; recycle water used | none; recycle water used | HCl 50 µL | HCl 50 µL | 4N $H_2SO_4$ 150 µL | 4N $H_2SO_4$ 151 µL | 4N $H_2SO_4$ 151 µL | none | none |
| Time (hrs) | Absorbance at 470 nm with time | | | | | | | | | | | | |
| 0 | 0.0118 | 0.0144 | 0.0114 | 0.0119 | 0.0118 | 0.0128 | 0.0103 | 0.0109 | 0.0152 | 0.0126 | 0.0102 | 0.0191 | 0.0186 |
| 22 | 0.0117 | 0.0155 | 0.0093 | 0.0097 | 0.0119 | 0.0111 | 0.0109 | 0.0102 | 0.0208 | 0.0195 | 0.0113 | 0.0606 | 0.0663 |
| 47 | 0.0119 | 0.0118 | 0.0100 | 0.0168 | 0.0173 | 0.0069 | 0.0080 | 0.0074 | 0.0266 | 0.0375 | 0.0071 | 0.0952 | 0.0893 |
| 71 | 0.0274 | 0.0235 | 0.0084 | 0.0096 | 0.0140 | 0.0102 | 0.0086 | 0.0093 | 0.0641 | 0.0723 | 0.0075 | 0.110 | 0.109 |
| 214 | 0.0838 | 0.0730 | 0.0092 | 0.0129 | 0.0218 | 0.0159 | 0.0232 | 0.0226 | 0.119 | 0.105 | 0.0418 | 0.219 | 0.220 |

The data of Table 10 show that Examples 99 and 100 without added acid developed higher level of color than the other examples which contained added acid. The data also show that a recycle water stream which had been previously used to treat a base-containing solution and which comprised a salt was effective for suppressing color development.

EXAMPLES 101–103

Resorcinol arylate-containing block copolyestercarbonates are prepared as described in any of Examples 12–28 with either 20%, 50%, or 80% by weight carbonate blocks and 1:1 ratio of isophthalate to terephthalate in the resorcinol arylate blocks. The resorcinol which is employed in each synthesis is added as a solution in recycle water as described in Examples 91–93, said solution having a pH of about 3 or less. The recycle water is analyzed for triethylamine-comprising species. If necessary, additional triethylamine or triethylamine hydrochloride is added or the recycle water is diluted with water to adjust the total amount of triethylamine so that the triethylamine in the reaction mixture is derived from the recycle water. The product copolyestercarbonates are lighter in color than comparable copolyestercarbonates made using triethylamine and resorcinol which is prepared as an aqueous solution in untreated water.

EXAMPLES 104–106

Resorcinol arylate-containing block copolyestercarbonates are prepared as described in any of Examples 29–45 with either 20%, 50%, or 80% by weight carbonate blocks and 1:1 ratio of isophthalate to terephthalate in the resorcinol arylate blocks. The resorcinol which is employed in each synthesis is added as a solution in recycle water, said solution having a pH of about 3 or less. The recycle water is derived from washing an organic solution comprising a condensation polymer and an alkali metal halide. The product copolyestercarbonates are lighter in color than comparable copolyestercarbonates made using resorcinol which is prepared as an aqueous solution in untreated water.

EXAMPLES 107–109

Resorcinol arylate-containing block copolyestercarbonates are prepared as described in Example 47 with either 20%, 50%, or 80% by weight carbonate blocks and 1:1 ratio of isophthalate to terephthalate in the resorcinol arylate blocks. The resorcinol which is employed in each synthesis is added as a solution in recycle water, said solution having a pH of about 3 or less. The recycle water is water recovered from washing an organic solution comprising a condensation polymer and an ammonium salt phase transfer catalyst with an aqueous solution comprising hydrochloric acid. The recycle water is analyzed for species comprising ammonium salt phase transfer catalyst. If necessary, additional phase transfer catalyst is added or the recycle water is diluted with water to adjust the total amount of phase transfer catalyst so that the phase transfer catalyst in the reaction mixture is derived from the recycle water. The product copolyestercarbonates are lighter in color than comparable copolyestercarbonates made using phase transfer catalyst and resorcinol which is prepared as an aqueous solution in untreated water.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All U.S. Patents and U.S. patent applications cited herein are incorporated herein by reference.

What is claimed is:

1. An interfacial method for preparing polymers comprising resorcinol arylate polyester chain members substantially free of anhydride linkages linking at least two mers of the polymer chain, comprising the steps of:
    (a) preparing an aqueous solution comprising at least one resorcinol moiety and an acid, said solution having a pH less than or equal to about 5;
    (b) after step (a), preparing a mixture comprising the resorcinol moiety, at least one catalyst and at least one organic solvent substantially immiscible with water; and
    (c) adding to the mixture from (b) at least one dicarboxylic acid dichloride while maintaining the pH between 3 and 8.5 through the presence of an acid acceptor, wherein the total molar amount of acid chloride groups is stoichiometrically deficient relative to the total molar amount of phenolic groups.

2. The method of claim 1 wherein the aqueous solution comprises at least one member selected from the group consisting of an inorganic acid, hydrochloric acid, phosphoric acid, phosphorous acid, sulfuric acid, an organic acid, an organic sulfonic acid, methanesulfonic acid, p-toluenesulfonic acid, a sulfonic acid-functionalized ion exchange resin, an organic carboxylic acid, acetic acid, a halogenated acetic acid, monochloroacetic acid, dichloroacetic acid, trichloroacetic acid, propionic acid, gluconic acid, ascorbic acid, and mixtures thereof.

3. The method of claim 1 wherein the aqueous solution further comprises at least one amine salt.

4. The method of claim 3 wherein the amine salt comprises at least one member selected from the group consisting of a trialkylamine hydrochloride salt, a quaternary ammonium salt, a quaternary phosphonium salt, and a hexaalkylguanidinium salt.

5. The method of claim 1 wherein the aqueous solution further comprises at least one amine salt and an alkali metal halide selected from the group consisting of sodium chloride, sodium fluoride, potassium chloride, or potassium fluoride.

6. The method of claim 1 further comprising the step of: adjusting the pH of the reaction mixture to between 7 and 12 following addition of the dicarboxylic acid dichloride.

7. The method of claim 6 further comprising the step of: stirring the reaction mixture for at least 3 minutes at pH between 7 and 12.

8. The method of claim 1 wherein the resorcinol moiety is selected from the group consisting of unsubstituted resorcinol, 2-methyl resorcinol, and mixtures thereof.

9. The method of claim 8 wherein the resorcinol moiety is unsubstituted resorcinol.

10. The method of claim 1 wherein the catalyst is selected from the group consisting of tertiary amines, quaternary ammonium salts, quaternary phosphonium salts, hexaalkylguanidinium salts, and mixtures thereof.

11. The method of claim 10 wherein the catalyst is selected from the group consisting of triethylamine, dimethylbutylamine, N-ethylpiperidine, N-methylpiperidine, diisopropylethyl amine, 2,2,6,6-tetramethylpiperidine, tetrapropylammonium bromide, tetrabutylammonium bromide, tetrabutylammonium chloride, methyltributylammonium chloride, benzyltriethylammonium chloride, cetyltrimethylammonium bromide, tetrabutylphosphonium bromide, hexaethylguanidinium chloride, and mixtures thereof.

12. The method of claim 10 wherein the catalyst is at least one tertiary amine.

13. The method of claim 12 wherein all tertiary amine is present before addition of dicarboxylic acid dichloride to resorcinol moiety.

14. The method of claim 12 wherein a portion of any tertiary amine is added following addition of dicarboxylic acid dichloride to resorcinol moiety.

15. The method of claim 10 wherein at least a portion of the total amount of catalyst is provided by the aqueous solution comprising at least one resorcinol moiety.

16. The method of claim 15 wherein the total amount of catalyst is provided by the aqueous solution comprising at least one resorcinol moiety.

17. The method of claim 1 wherein the organic solvent is selected from the group consisting of chloroform, chlorobenzene, dichloromethane, 1,2-dichloroethane, dichlorobenzene, toluene, xylene, trimethylbenzene, and mixtures thereof.

18. The method of claim 1 wherein the dicarboxylic acid dichloride is selected from the group consisting of isophthaloyl dichloride, terephthaloyl dichloride, naphthalene-2,6-dicarboxylic acid dichloride, and mixtures thereof.

19. The method of claim 18 further comprising at least one aliphatic dicarboxylic acid dichloride.

20. The method of claim 19 wherein the aliphatic dicarboxylic acid dichloride is selected from the group consisting of sebacoyl chloride and cyclohexane-1,4-dicarboxylic acid dichloride.

21. The method of claim 18 wherein the dicarboxylic acid dichloride is a mixture of isophthaloyl dichloride and terephthaloyl dichloride.

22. The method of claim 21 wherein the ratio of isophthaloyl dichloride to terephthaloyl dichloride is about 0.2–5:1.

23. The method of claim 22 wherein the ratio of isophthaloyl dichloride to terephthaloyl dichloride is about 0.8–2.5:1.

24. The method of claim 1 wherein the stoichiometric ratio of total phenolic groups to total acid chloride groups is about 1.5–1.01:1.

25. The method of claim 24 wherein the stoichiometric ratio of total phenolic groups to total acid chloride groups is about 1.2–1.02:1.

26. The method of claim 1 wherein the pH is maintained using an alkali metal hydroxide, an alkaline earth hydroxide, or an alkaline earth oxide.

27. The method of claim 26 wherein the pH is maintained using aqueous sodium hydroxide.

28. The method of claim 1 wherein the pH is maintained through simultaneous addition of acid acceptor with the dicarboxylic acid dichloride.

29. The method of claim 1 further comprising at least one chain-stopper selected from the group consisting of mono-phenolic compounds, mono-carboxylic acid chlorides, mono-chloroformates, and mixtures thereof.

30. The method of claim 29 wherein the chain-stopper is at least one mono-phenolic compound selected from the group consisting of phenol, alkyl-substituted phenol, p-cumylphenol, p-tertiary-butyl phenol, diphenol monoester, resorcinol monobenzoate, diphenol monoether, and p-methoxyphenol.

31. The method of claim 30 wherein the mono-phenolic compound is present with the resorcinol moiety.

32. The method of claim 29 wherein the chain-stopper is at least one mono-carboxylic acid chloride selected from the group consisting of benzoyl chloride, alkyl-substituted benzoyl chloride, toluoyl chloride, halogen-substituted benzoyl chloride, bromobenzoyl chloride, trimellitic anhydride chloride, cinnamoyl chloride, 4-nadimidobenzoyl chloride, and mixtures thereof.

33. The method of claim 32 wherein the mono-carboxylic acid chloride is present with the dicarboxylic acid dichloride.

34. The method of claim 29 wherein the chain-stopper is at least one mono-chloroformate selected from the group consisting of phenyl chloroformate, alkyl-substituted phenyl chloroformate, p-cumyl phenyl chloroformate, toluene chloroformate, and mixtures thereof.

35. The method of claim 34 wherein the mono-chloroformate is present with the dicarboxylic acid dichloride.

36. The method of claim 1 wherein the polymer is recovered from the mixture.

37. A polymer made by the method of claim 1, wherein said polymer is lighter in color than a corresponding polymer made without using step (a) of the method.

38. A polymer made by the method of claim 9, wherein said polymer is lighter in color than a corresponding polymer made without using step (a) of the method.

39. A polymer made by the method of claim 21, wherein said polymer is lighter in color than a corresponding polymer made without using step (a) of the method.

40. A polymer made by the method of claim 29, wherein said polymer is lighter in color than a corresponding polymer made without using step (a) of the method.

41. A polymer consisting essentially of resorcinol arylate polyester chain members substantially free of anhydride linkages linking at least two mers of the polymer chain, prepared by an interfacial method, comprising the steps of:
   (a) preparing an aqueous solution comprising at least one resorcinol moiety and an acid, said solution having a pH less than or equal to about 5;
   (b) after step (a), preparing a mixture comprising the resorcinol moiety, at least one catalyst and at least one organic solvent substantially immiscible with water; and
   (c) adding to the mixture from (b) at least one dicarboxylic acid dichloride while maintaining the pH between 3 and 8.5 through the presence of an acid acceptor, wherein the total molar amount of acid chloride groups is stoichiometrically deficient relative to the total molar amount of phenolic groups.

42. The polymer of claim 41 wherein the aqueous solution comprises at least one member selected from the group consisting of an inorganic acid, hydrochloric acid, phosphoric acid, phosphorous acid, sulfuric acid, an organic acid, an organic sulfonic acid, methanesulfonic acid, p-toluenesulfonic acid, a sulfonic acid-functionalized ion exchange resin, an organic carboxylic acid, acetic acid, a halogenated acetic acid, monochloroacetic acid, dichloroacetic acid, trichloroacetic acid, propionic acid, gluconic acid, ascorbic acid, and mixtures thereof.

43. The polymer of claim 41 wherein the aqueous solution further comprises at least one amine salt.

44. The polymer of claim 43 wherein the amine salt comprises at least one member selected from the group consisting of a trialkylamine hydrochloride salt, a quaternary ammonium salt, a quaternary phosphonium salt, and a hexaalkylguanidinium salt.

45. The polymer of claim 41 wherein the aqueous solution further comprises at least one amine salt and an alkali metal halide selected from the group consisting of sodium chloride, sodium fluoride, potassium chloride, or potassium fluoride.

46. The polymer of claim 41, prepared by an interfacial method further comprising the step of: adjusting the pH of the reaction mixture to between 7 and 12 following addition of the dicarboxylic acid dichloride.

47. The polymer of claim 46, prepared by an interfacial method further comprising the step of: stirring the reaction mixture for at least 3 minutes at pH between 7 and 12.

48. The polymer of claim 41 wherein the resorcinol moiety is selected from the group consisting of unsubstituted resorcinol, 2-methyl resorcinol, and mixtures thereof.

49. The polymer of claim 48 wherein the resorcinol moiety is unsubstituted resorcinol.

50. The polymer of claim 41 wherein the catalyst is at least one member selected from the group consisting of a tertiary amine and a quaternary ammonium salt.

51. The polymer of claim 50 wherein at least a portion of the total amount of catalyst is provided by the aqueous solution comprising at least one resorcinol moiety.

52. The polymer of claim 51 wherein the total amount of catalyst is provided by the aqueous solution comprising at least one resorcinol moiety.

53. The polymer of claim 41 wherein the dicarboxylic acid dichloride is selected from the group consisting of isophthaloyl dichloride, terephthaloyl dichloride, naphthalene-2,6-dicarboxylic acid dichloride, and mixtures thereof.

54. The polymer of claim 53 wherein the dicarboxylic acid dichloride is a mixture of isophthaloyl dichloride and terephthaloyl dichloride.

55. The polymer of claim 54 wherein the ratio of isophthaloyl dichloride to terephthaloyl dichloride is about 0.2–5:1.

56. The polymer of claim 55 wherein the ratio of isophthaloyl dichloride to terephthaloyl dichloride is about 0.8–2.5:1.

57. The polymer of claim 41 wherein the stoichiometric ratio of total phenolic groups to total acid chloride groups is about 1.5–1.01:1.

58. The polymer of claim 57 wherein the stoichiometric ratio of total phenolic groups to total acid chloride groups is about 1.2–1.02:1.

59. The polymer of claim 41 prepared by an interfacial method wherein the pH is maintained using an alkali metal hydroxide, an alkaline earth hydroxide, or an alkaline earth oxide.

60. The polymer of claim 59 prepared by an interfacial method wherein the pH is maintained using aqueous sodium hydroxide.

61. The polymer of claim 41 further comprising at least one chain-stopper selected from the group consisting of mono-phenolic compounds, mono-carboxylic acid chlorides, mono-chloroformates, and mixtures thereof.

62. The polymer of claim 41 wherein the molecular weight of said polymer decreases by less than 30% upon heating said polymer at a temperature of about 280–290° C. for five minutes.

63. The polymer of claim 62 wherein the molecular weight of said polymer decreases by less than 10% upon heating at a temperature of about 280–290° C. for five minutes.

64. The polymer of claim 41, wherein said polymer is lighter in color than a corresponding polymer made without using step (a) of the method.

65. A polymer consisting essentially of resorcinol arylate polyester chain members substantially free of anhydride linkages linking at least two mers of the polymer chain, prepared by an interfacial method, comprising the steps of:

(a) preparing an aqueous solution comprising an acid and at least one of unsubstituted resorcinol or 2-methylresorcinol or mixtures thereof, said solution having a pH less than or equal to about 5;

(b) after step (a), preparing a mixture comprising at least one of unsubstituted resorcinol or 2-methylresorcinol or mixtures thereof; at least one catalyst selected from the group consisting of quaternary ammonium salts and tertiary amines; at least one mono-phenolic chain-stopper and dichloromethane; and (c) adding to the mixture from (b) a mixture of isophthaloyl dichloride and terephthaloyl dichloride in a molar ratio of isophthalate to terephthalate of 0.4–2.5:1, while maintaining the pH between 3 and 8.5 through addition of aqueous sodium hydroxide, wherein the ratio of moles total phenolic groups to moles total acid chloride groups is 1.5–1.01:1;

(d) adjusting the pH of the reaction mixture to between 8.5 and 10 following addition of the dicarboxylic acid dichloride mixture, and stirring the reaction mixture for at least 3 minutes at said pH; and (e) isolating the polymer, said polymer decreasing in molecular weight by less than 30% upon heating at a temperature of about 280–290° C. for five minutes, wherein said polymer is lighter in color than a corresponding polymer made without using step (a) of the method.

66. The polymer of claim 65 wherein the aqueous solution comprises at least one member selected from the group consisting of an inorganic acid, hydrochloric acid, phosphoric acid, phosphorous acid, sulfuric acid, an organic acid, an organic sulfonic acid, methanesulfonic acid, p-toluenesulfonic acid, a sulfonic acid-functionalized ion exchange resin, an organic carboxylic acid, acetic acid, a halogenated acetic acid, monochloroacetic acid, dichloroacetic acid, trichloroacetic acid, propionic acid, gluconic acid, ascorbic acid, and mixtures thereof.

67. The polymer of claim 65 wherein the aqueous solution further comprises triethylamine hydrochloride.

68. The polymer of claim 67 wherein the aqueous solution further comprises sodium chloride.

69. The polymer of claim 65 wherein at least a portion of the total amount of catalyst is provided by the aqueous solution comprising at least one of unsubstituted resorcinol or 2-methylresorcinol or mixtures thereof.

70. The polymer of claim 69 wherein the total amount of catalyst is provided by the aqueous solution comprising at least one of unsubstituted resorcinol or 2-methylresorcinol or mixtures thereof.

71. A copolymer consisting essentially of resorcinol arylate polyester chain members in combination with $C_{3-20}$ straight chain alkylene, $C_{3-10}$ branched alkylene, or $C_{4-10}$ cyclo- or bicyclo-alkylene chain members, substantially free of anhydride linkages linking at least two mers of the polymer chain, prepared by an interfacial method, comprising the steps of:

(a) preparing an aqueous solution comprising at least one resorcinol moiety and an acid, said solution having a pH less than or equal to about 5;

(b) after step (a), preparing a mixture comprising the resorcinol moiety, at least one catalyst and at least one organic solvent substantially immiscible with water; and (c) adding to the mixture from (b) at least one dicarboxylic acid dichloride while maintaining the pH between 3 and 8.5 through the presence of an acid acceptor, wherein the total molar amount of acid chloride groups is stoichiometrically deficient relative to the total molar amount of phenolic groups.

72. The copolymer of claim 71 wherein the aqueous solution comprises at least one member selected from the group consisting of an inorganic acid, hydrochloric acid, phosphoric acid, phosphorous acid, sulfuric acid, an organic acid, an organic sulfonic acid, methanesulfonic acid, p-toluenesulfonic acid, a sulfonic acid-functionalized ion exchange resin, an organic carboxylic acid, acetic acid, a halogenated acetic acid, monochloroacetic acid, dichloroacetic acid, trichloroacetic acid, propionic acid, gluconic acid, ascorbic acid, and mixtures thereof.

73. The copolymer of claim 71 wherein the aqueous solution further comprises at least one amine salt.

74. The copolymer of claim 73 wherein the amine salt comprises at least one member selected from the group consisting of a trialkylamine hydrochloride salt, a quaternary ammonium salt, a quaternary phosphonium salt, and a hexaalkylguanidinium salt.

75. The copolymer of claim 71 wherein the aqueous solution further comprises at least one amine salt and an alkali metal halide selected from the group consisting of sodium chloride, sodium fluoride, potassium chloride, or potassium fluoride.

76. The copolymer of claim 71, prepared by an interfacial method further comprising the step of: adjusting the pH of the reaction mixture to between 7 and 12 following addition of the dicarboxylic acid dichloride.

77. The copolymer of claim 76, prepared by an interfacial method further comprising the step of: stirring the reaction mixture for at least 3 minutes at pH between 7 and 12.

78. The copolymer of claim 71 wherein the resorcinol moiety is selected from the group consisting of unsubstituted resorcinol, 2-methyl resorcinol, and mixtures thereof.

79. The copolymer of claim 78 wherein the resorcinol moiety is unsubstituted resorcinol.

80. The copolymer of claim 71 wherein the catalyst is at least one member selected from the group consisting of a tertiary amine and a quaternary ammonium salt.

81. The copolymer of claim 80 wherein at least a portion of the total amount of catalyst is provided by the aqueous solution comprising at least one resorcinol moiety.

82. The copolymer of claim 81 wherein the total amount of catalyst is provided by the aqueous solution comprising at least one resorcinol moiety.

83. The copolymer of claim 71 wherein the dicarboxylic acid dichloride is at least one member selected from the group consisting of isophthaloyl dichloride, terephthaloyl dichloride, naphthalene-2,6-dicarboxylic acid dichloride, sebacoyl chloride, cyclohexane-1,4-dicarboxylic acid dichloride and mixtures thereof.

84. The copolymer of claim 83 wherein the dicarboxylic acid dichloride is a mixture of isophthaloyl dichloride and sebacoyl chloride.

85. The copolymer of claim 84 comprising from about 1 to about 45 mole % sebacate chain members.

86. The copolymer of claim 71 wherein the stoichiometric ratio of total phenolic groups to total acid chloride groups is about 1.5–1.01:1.

87. The copolymer of claim 86 wherein the stoichiometric ratio of total phenolic groups to total acid chloride groups is about 1.2–1.02:1.

88. The copolymer of claim 71 prepared by an interfacial method wherein the pH is maintained using an alkali metal hydroxide, an alkaline earth hydroxide, or an alkaline earth oxide.

89. The copolymer of claim 88 prepared by an interfacial method wherein the pH is maintained using aqueous sodium hydroxide.

90. The copolymer of claim 71 further comprising at least one chain-stopper selected from the group consisting of mono-phenolic compounds, mono-carboxylic acid chlorides, mono-chloroformates, and mixtures thereof.

91. The copolymer of claim 71 wherein the molecular weight of said copolymer decreases by less than 10% upon heating said polymer at a temperature of about 280–290° C. for five minutes.

92. The copolymer of claim 91 wherein the molecular weight of said copolymer decreases by less than 5% upon heating at a temperature of about 280–290° C. for five minutes.

93. The copolymer of claim 71, wherein said polymer is lighter in color than a corresponding polymer made without using step (a) of the method.

94. A copolymer consisting essentially of resorcinol arylate polyester chain members in combination with $C_{10}$ straight chain alkylene or $C_6$ cycloalkylene chain members, substantially free of anhydride linkages linking at least two mers of the polymer chain, prepared by an interfacial method, comprising the steps of:

(a) preparing an aqueous solution comprising an acid and at least one of unsubstituted resorcinol or 2-methylresorcinol or mixtures thereof, said solution having a pH less than or equal to about 5;

(b) after step (a), preparing a mixture comprising at least one of unsubstituted resorcinol or 2-methylresorcinol or mixtures thereof; at least one catalyst selected from the group consisting of quaternary ammonium salts and tertiary amines; at least one mono-phenolic chain-stopper and dichloromethane;

(c) adding to the mixture from (b) a mixture comprising at least two members selected from the group consisting of isophthaloyl dichloride, terephthaloyl dichloride, sebacoyl chloride and cyclohexane-1,4-dicarboxylic acid dichloride, while maintaining the pH between 3 and 8.5 through addition of aqueous sodium hydroxide, wherein the ratio of moles total phenolic groups to moles total acid chloride groups is 1.5–1.01:1;

(d) adjusting the pH of the reaction mixture to between 8.5 and 10 following addition of the dicarboxylic acid dichloride mixture, and stirring the reaction mixture for at least 3 minutes at said pH; and (e) isolating the copolymer, said copolymer decreasing in molecular weight by less than 10% upon heating at a temperature of about 280–290° C. for five minutes, wherein said polymer is lighter in color than a corresponding polymer made without using step (a) of the method.

95. The copolymer of claim 94 wherein the aqueous solution comprises at least one member selected from the group consisting of an inorganic acid, hydrochloric acid, phosphoric acid, phosphorous acid, sulfuric acid, an organic acid, an organic sulfonic acid, methanesulfonic acid, p-toluenesulfonic acid, a sulfonic acid-functionalized ion exchange resin, an organic carboxylic acid, acetic acid, a halogenated acetic acid, monochloroacetic acid, dichloroacetic acid, trichloroacetic acid, propionic acid, gluconic acid, ascorbic acid, and mixtures thereof.

96. The copolymer of claim 94 wherein the aqueous solution further comprises triethylamine hydrochloride.

97. The copolymer of claim 96 wherein the aqueous solution further comprises sodium chloride.

98. The copolymer of claim 94 wherein at least a portion of the total amount of catalyst is provided by the aqueous solution comprising at least one of unsubstituted resorcinol or 2-methylresorcinol or mixtures thereof.

99. The copolymer of claim 98 wherein the total amount of catalyst is provided by the aqueous solution comprising at least one of unsubstituted resorcinol or 2-methylresorcinol or mixtures thereof.

100. A block copolymer consisting essentially or resorcinol arylate polyester segments in combination with organic carbonate segments, substantially free of anhydride linkages linking at least two mers of the polymer chain, prepared by an interfacial method, comprising the steps of:
  (a) preparing an aqueous solution comprising at least one resorcinol moiety and an acid, said solution having a pH less than or equal to about 5;
  (b) after step (a), preparing a mixture comprising the resorcinol moiety, at least one catalyst and at least one organic solvent substantially immiscible with water;
  (c) adding to the mixture from (b) at least one dicarboxylic acid dichloride while maintaining the pH between 3 and 8.5 through the presence of an acid acceptor, wherein the total molar amount of acid chloride groups is stoichiometrically deficient relative to the total molar amount of phenolic groups; and
  (d) introducing at least one polycarbonate block segment into the product from (c).

101. The copolymer of claim 100 wherein the aqueous solution comprises at least one member selected from the group consisting of an inorganic acid, hydrochloric acid, phosphoric acid, phosphorous acid, sulfuric acid, an organic acid, an organic sulfonic acid, methanesulfonic acid, p-toluenesulfonic acid, a sulfonic acid-functionalized ion exchange resin, an organic carboxylic acid, acetic acid, a halogenated acetic acid, monochloroacetic acid, dichloroacetic acid, trichloroacetic acid, propionic acid, gluconic acid, ascorbic acid, and mixtures thereof.

102. The copolymer of claim 100 wherein the aqueous solution further comprises at least one amine salt.

103. The copolymer of claim 102 wherein the amine salt comprises at least one member selected from the group consisting of a trialkylamine hydrochloride salt, a quaternary ammonium salt, a quaternary phosphonium salt, and a hexaalkylguanidinium salt.

104. The copolymer of claim 100 wherein the aqueous solution further comprises at least one amine salt and an alkali metal halide selected from the group consisting of sodium chloride, sodium fluoride, potassium chloride, or potassium fluoride.

105. The copolymer of claim 100, prepared by an interfacial method further comprising the step of: adjusting the pH of the reaction mixture to between 7 and 12 following addition of the dicarboxylic acid dichloride.

106. The copolymer of claim 105, prepared by an interfacial method further comprising the step of: stirring the reaction mixture for at least 3 minutes at pH between 7 and 12.

107. The copolymer of claim 100 wherein the resorcinol moiety is selected from the group consisting of unsubstituted resorcinol, 2-methyl resorcinol, and mixtures thereof.

108. The copolymer of claim 107 wherein the resorcinol moiety is unsubstituted resorcinol.

109. The copolymer of claim 100 wherein the catalyst is at least one member selected from the group consisting of a tertiary amine and a quaternary ammonium salt.

110. The copolymer of claim 109 wherein at least a portion of the total amount of catalyst is provided by the aqueous solution comprising at least one resorcinol moiety.

111. The copolymer of claim 110 wherein the total amount of catalyst is provided by the aqueous solution comprising at least one resorcinol moiety.

112. The copolymer of claim 100 wherein the dicarboxylic acid dichloride is at least one member selected from the group consisting of isophthaloyl dichloride, terephthaloyl dichloride, naphthalene-2,6-dicarboxylic acid dichloride, sebacoyl chloride, cyclohexane-1,4-dicarboxylic acid dichloride and mixtures thereof.

113. The copolymer of claim 112 wherein the dicarboxylic acid dichloride is a mixture of isophthaloyl dichloride and terephthaloyl dichloride.

114. The copolymer of claim 113 wherein the ratio of isophthaloyl dichloride to terephthaloyl dichloride is about 0.2–5:1.

115. The copolymer of claim 114 wherein the ratio of isophthaloyl dichloride to terephthaloyl dichloride is about 0.8–2.5:1.

116. The copolymer of claim 114 wherein the stoichiometric ratio of total phenolic groups to total acid chloride groups is about 1.5–1.01:1.

117. The copolymer of claim 116 wherein the stoichiometric ratio of total phenolic groups to total acid chloride groups is about 1.2–1.02:1.

118. The copolymer of claim 100 prepared by an interfacial method wherein the pH is maintained using an alkali metal hydroxide, an alkaline earth hydroxide, or an alkaline earth oxide.

119. The copolymer of claim 118 prepared by an interfacial method wherein the pH is maintained using aqueous sodium hydroxide.

120. The copolymer of claim 100 wherein the organic carbonate segments comprise at least one dihydroxy-substituted aromatic hydrocarbon.

121. The copolymer of claim 120 wherein the dihydroxy-substituted aromatic hydrocarbon is bisphenol A.

122. The copolymer of claim 120 further comprising at least one chain-stopper selected from the group consisting of mono-phenolic compounds, mono-carboxylic acid chlorides, mono-chloroformates, and mixtures thereof.

123. The copolymer of claim 100 wherein the molecular weight of said copolymer decreases by less than 12% upon heating said polymer at a temperature of about 280–290° C. for five minutes.

124. The copolymer of claim 123 wherein the molecular weight of said copolymer decreases by less than 5% upon heating at a temperature of about 280–290° C. for five minutes.

125. The copolymer of claim 100, wherein said polymer is lighter in color than a corresponding polymer made without using step (a) of the method.

126. A block copolymer consisting essentially of resorcinol arylate polyester segments in combination with organic carbonate segments, substantially free of anhydride linkages linking at least two mers of the polymer chain, prepared by an interfacial method, comprising the steps of:
  (a) preparing an aqueous solution comprising an acid and at least one of unsubstituted resorcinol or 2-methylresorcinol or mixtures thereof, said solution having a pH less than or equal to about 5;
  (b) after step (a), preparing a mixture comprising at least one of unsubstituted resorcinol or 2-methylresorcinol or mixtures thereof; at least one catalyst selected from the group consisting of quaternary ammonium salts and tertiary amines; at least one mono-phenolic chain-stopper and dichloromethane;
  (c) adding to the mixture from (b) a mixture of isophthaloyl dichloride and terephthaloyl dichloride in a molar ratio of isophthalate to terephthalate of 0.4–2.5-1, while maintaining the pH between 3 and 8.5 through addition of aqueous sodium hydroxide, wherein the ratio of moles total phenolic groups to moles total acid chloride groups is 1.5–1.01:1;

(d) adjusting the pH of the reaction mixture to between 8.5 and 12 following addition of the dicarboxylic acid dichloride mixture, and stirring the reaction mixture for at least 3 minutes at said pH;

(e) combining the product from (d) with at least one dihydroxy-substituted aromatic hydrocarbon, at least one mono-phenolic chain-stopper, and phosgene under basic conditions; and (f) isolating the copolymer, said copolymer decreasing in molecular weight by less than 12% upon heating at a temperature of about 280–290° C. for five minutes, wherein said polymer is lighter in color than a corresponding polymer made without using step (a) of the method.

127. The copolymer of claim 126 wherein the aqueous solution comprises at least one member selected from the group consisting of an inorganic acid, hydrochloric acid, phosphoric acid, phosphorous acid, sulfuric acid, an organic acid, an organic sulfonic acid, methanesulfonic acid, p-toluenesulfonic acid, a sulfonic acid-functionalized ion exchange resin, an organic carboxylic acid, acetic acid, a halogenated acetic acid, monochloroacetic acid, dichloroacetic acid, trichloroacetic acid, propionic acid, gluconic acid, ascorbic acid, and mixtures thereof.

128. The copolymer of claim 126 wherein the aqueous solution further comprises triethylamine hydrochloride.

129. The copolymer of claim 128 wherein the aqueous solution further comprises sodium chloride.

130. The copolymer of claim 126 wherein at least a portion of the total amount of catalyst is provided by the aqueous solution comprising at least one of unsubstituted resorcinol or 2-methylresorcinol or mixtures thereof.

131. The copolymer of claim 130 wherein the total amount of catalyst is provided by the aqueous solution comprising at least one of unsubstituted resorcinol or 2-methylresorcinol or mixtures thereof.

* * * * *

UNITED STATES PATENT AND TRADEMARK OFFICE
CERTIFICATE OF CORRECTION

PATENT NO. : 6,596,843 B2
DATED : July 22, 2003
INVENTOR(S) : Daniel Joseph Brunelle et al.

It is certified that error appears in the above-identified patent and that said Letters Patent is hereby corrected as shown below:

Title page,
Item [57], ABSTRACT, replace the current ABSTRACT with the following replacement:

"Thermally stable polymers comprising resorcinol arylate chain members are prepared using an interfacial method comprising the steps of (a) preparing an aqueous solution comprising at least one resorcinol moiety, said solution having a pH less than or equal to about 5; (b) after step (a), preparing a mixture comprising the resorcinol moiety, at least one catalyst and at least one organic solvent substantially immiscible with water; and (c) adding to the mixture from (b) at least one dicarboxylic acid dichloride while maintaining the pH between 3 and 8.5 through the presence of an acid acceptor, wherein the total molar amount of acid chloride groups is stoichiometrically deficient relative to the total molar amount of phenolic groups."

Column 37,
Line 38, replace "0.2-5:1" with -- 0.25-4.0:1 --
Line 41, replace "0.8-2.5:1" with -- 0.4-2.5:1 --

Signed and Sealed this

Second Day of March, 2004

JON W. DUDAS
*Acting Director of the United States Patent and Trademark Office*